US011463205B2

(12) United States Patent
Wu et al.

(10) Patent No.: US 11,463,205 B2
(45) Date of Patent: Oct. 4, 2022

(54) TECHNIQUES FOR TRANSMITTING SIDELINK HARQ FEEDBACK

(71) Applicant: QUALCOMM Incorporated, San Diego, CA (US)

(72) Inventors: Shuanshuan Wu, San Diego, CA (US); Kapil Gulati, Hillsborough, NJ (US); Sudhir Kumar Baghel, Hillsborough, NJ (US); Shailesh Patil, San Diego, CA (US); Arjun Bharadwaj, Cupertino, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 16/902,928

(22) Filed: Jun. 16, 2020

(65) Prior Publication Data

US 2020/0412494 A1  Dec. 31, 2020

Related U.S. Application Data

(60) Provisional application No. 62/867,756, filed on Jun. 27, 2019.

(51) Int. Cl.
*H04L 1/18* (2006.01)
*H04W 28/04* (2009.01)
(Continued)

(52) U.S. Cl.
CPC .......... *H04L 1/1854* (2013.01); *H04L 1/1812* (2013.01); *H04L 1/1864* (2013.01);
(Continued)

(58) Field of Classification Search
CPC ... H04L 1/1854; H04L 1/1812; H04L 1/1864; H04L 5/0055; H04L 1/1896; H04L 1/1861; H04W 28/04; H04W 92/18
See application file for complete search history.

(56) References Cited

U.S. PATENT DOCUMENTS 11,057,870 B2 * 7/2021 Huang .............. H04W 72/0406
2019/0149275 A1 5/2019 He et al.
(Continued)

FOREIGN PATENT DOCUMENTS

| EP | 3675529 A1 | 7/2020 |
| EP | 3909176 A1 | 11/2021 |
| EP | 3952173 A1 | 2/2022 |

OTHER PUBLICATIONS

Consideration on NR V2X configured grant resource allocation, ZTE, Sanechips, 11.4.2, pp. 2-3, R2-1906480, 3GPP TSG RAN WG meeting (Year: 2019).*

(Continued)

*Primary Examiner* — Tejis Daya
*Assistant Examiner* — Abdullahi Ahmed
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may determine a plurality of hybrid automatic repeat request (HARQ) feedback for a plurality of sidelink communications. The UE may identify at least a subset of HARQ feedback from the plurality of HARQ feedback based at least in part on one or more parameters. The UE may transmit, on a sidelink, the at least the subset of HARQ feedback in a HARQ feedback occasion. Numerous other aspects are provided.

32 Claims, 12 Drawing Sheets

(51) Int. Cl.
  *H04L 5/00* (2006.01)
  *H04W 92/18* (2009.01)
(52) U.S. Cl.
  CPC .......... *H04L 5/0055* (2013.01); *H04W 28/04* (2013.01); *H04W 92/18* (2013.01)

(56) References Cited

U.S. PATENT DOCUMENTS

| | | | |
|---|---|---|---|
| 2021/0007081 A1* | 1/2021 | Shin | H04L 1/1887 |
| 2021/0050950 A1* | 2/2021 | Zhou | H04L 1/1861 |
| 2021/0075552 A1* | 3/2021 | Huang | H04W 72/1278 |
| 2021/0144750 A1* | 5/2021 | Cao | H04W 72/042 |
| 2021/0227602 A1* | 7/2021 | Li | H04W 76/14 |
| 2021/0320759 A1* | 10/2021 | Lee | H04L 1/0005 |
| 2021/0321396 A1* | 10/2021 | Li | H04L 5/0098 |

OTHER PUBLICATIONS

Discussion on physical layer procedures for NR sidelink, LG electronics, 7.2.4.5, pp. 1-7, R1-1907018, 3GPP TSG RAN WG1 meeting (Year: 2019).*

International Search Report and Written Opinion—PCT/US2020/038173—ISAEPO—dated Sep. 29, 2020.

LG Electronics: "Discussion on Physical Layer Procedures for NR Sidelink", 3GPP Draft, 3GPP TSG RAN WG1 Meeting #97, R1-1907018 Discussion on Physical Layer Procedures for NR Sidelink, 3rd Generation Partnership Project (3GPP), Mobile Competence Centre, 650, Route Des Lucioles, F-06921 Sophia-Anti Polis, vol. RAN WG1, No. Reno. USA, May 13-17, 2019, May 13, 2019 (May 13, 2019), XP051728466, 11 pages, Retrieved from the Internet: URL: http://www.3gpp.org/ftp/Meetings%5F3GPP%5FSYNC/RAN1/Docs/R1%2D1907018%2Ezip, [retrieved on May 13, 2019], figure 1, Sections 2.2.1-2.2.4. Section 1.

ZTE et al., "Consideration on NR V2X Configured Grant Resource Allocation", 3GPP Draft, 3GPP TSG RAN WG2 Meeting #106, R2-1906480 Discussion on Configured Grant Resource Allocation, 3rd Generation Partnership Project (3GPP), Mobile Competence Centre, 650, Route Des Lucioles, F-06921 Sophia-Antipolis Cede, vol. RAN WG2, No. Reno. USA, May 13-17, 2019, May 13, 2019 (May 13, 2019), XP051729945, 4 pages, Retrieved from the Internet: URL: http://www.3gpp.org/ftp/Meetings%5F3GPP%5FSYNC/RAN2/Docs/R2%2D1906480%2Ezip, [retrieved on May 13, 2019], Section 2.1.1.

* cited by examiner

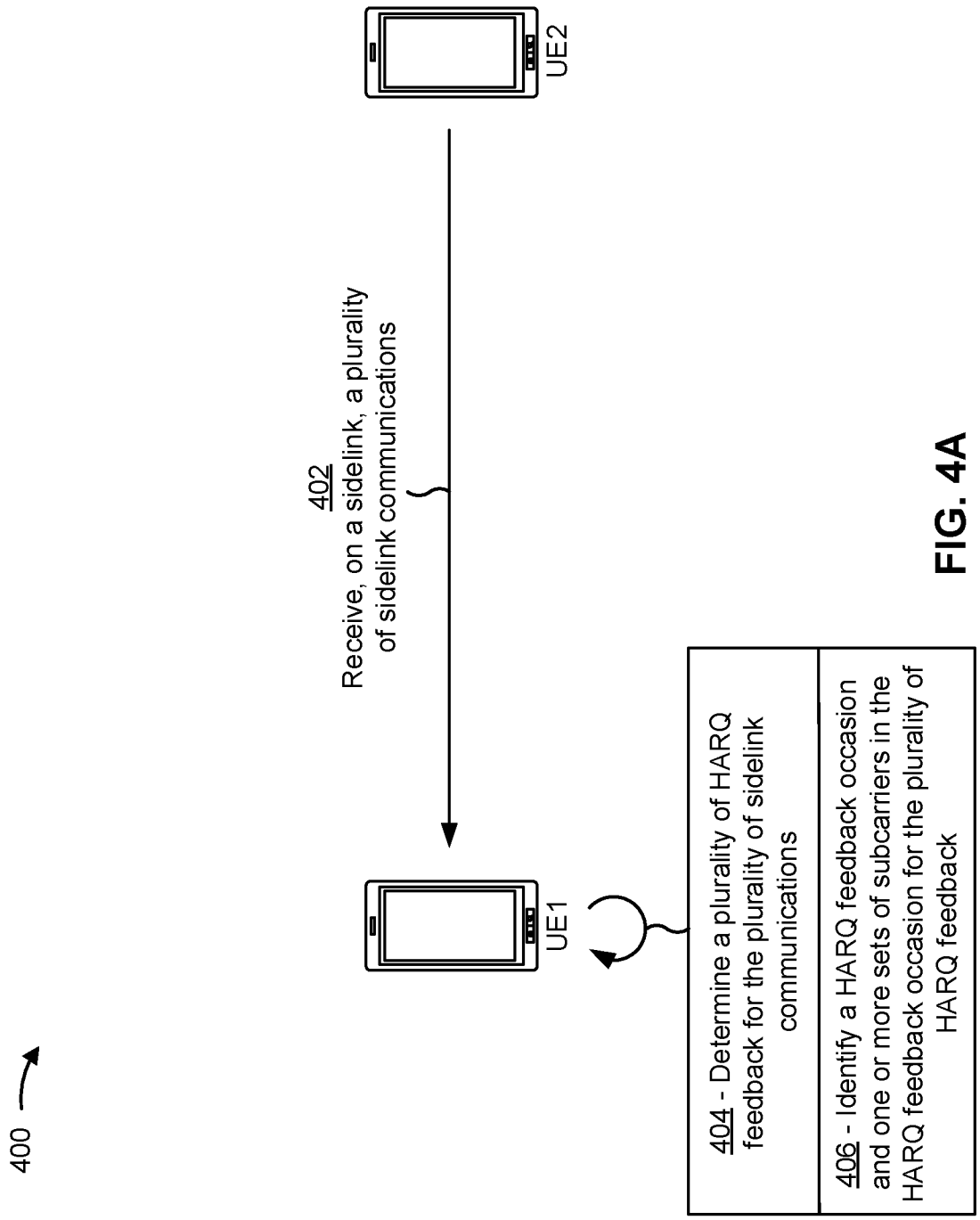

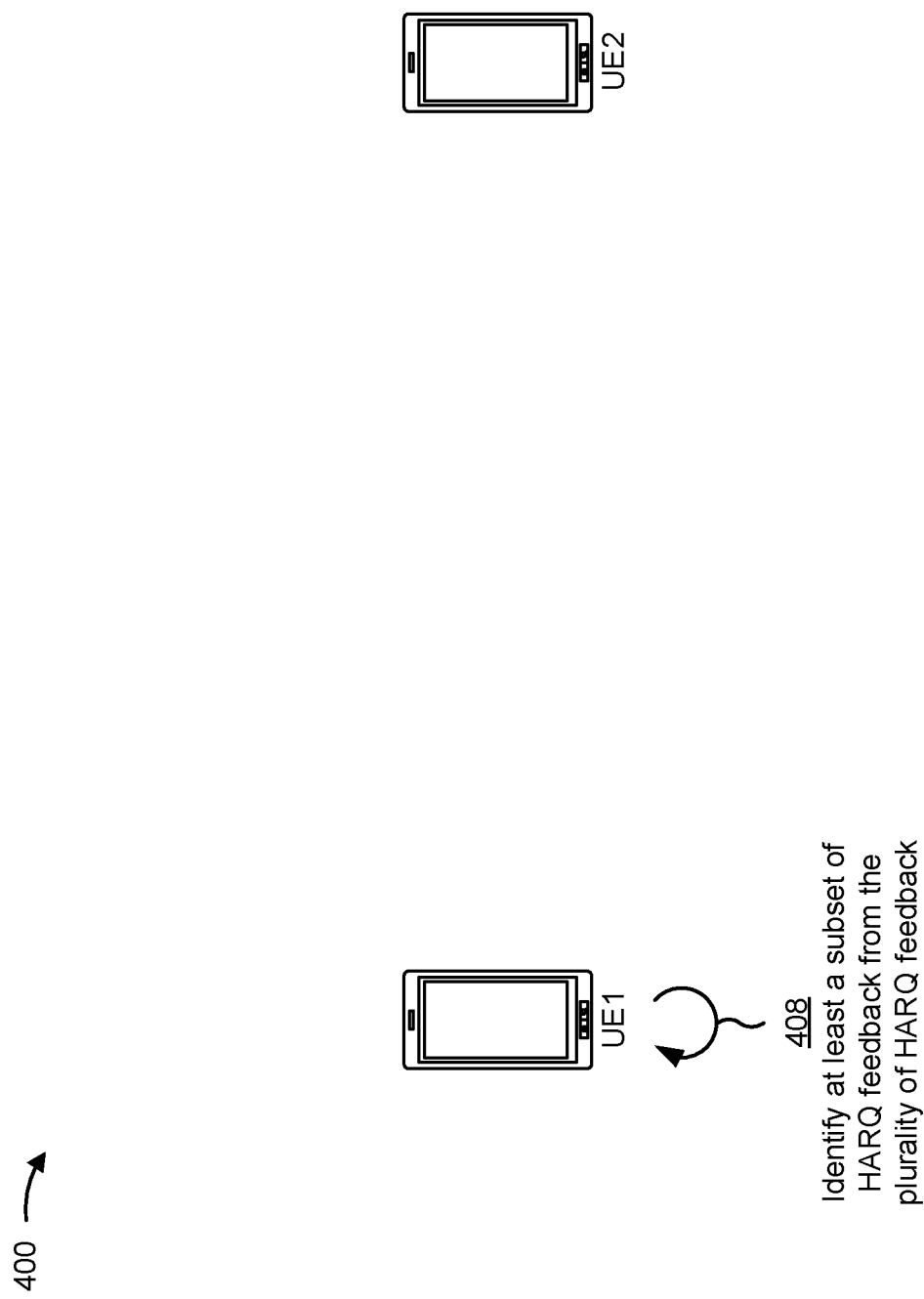

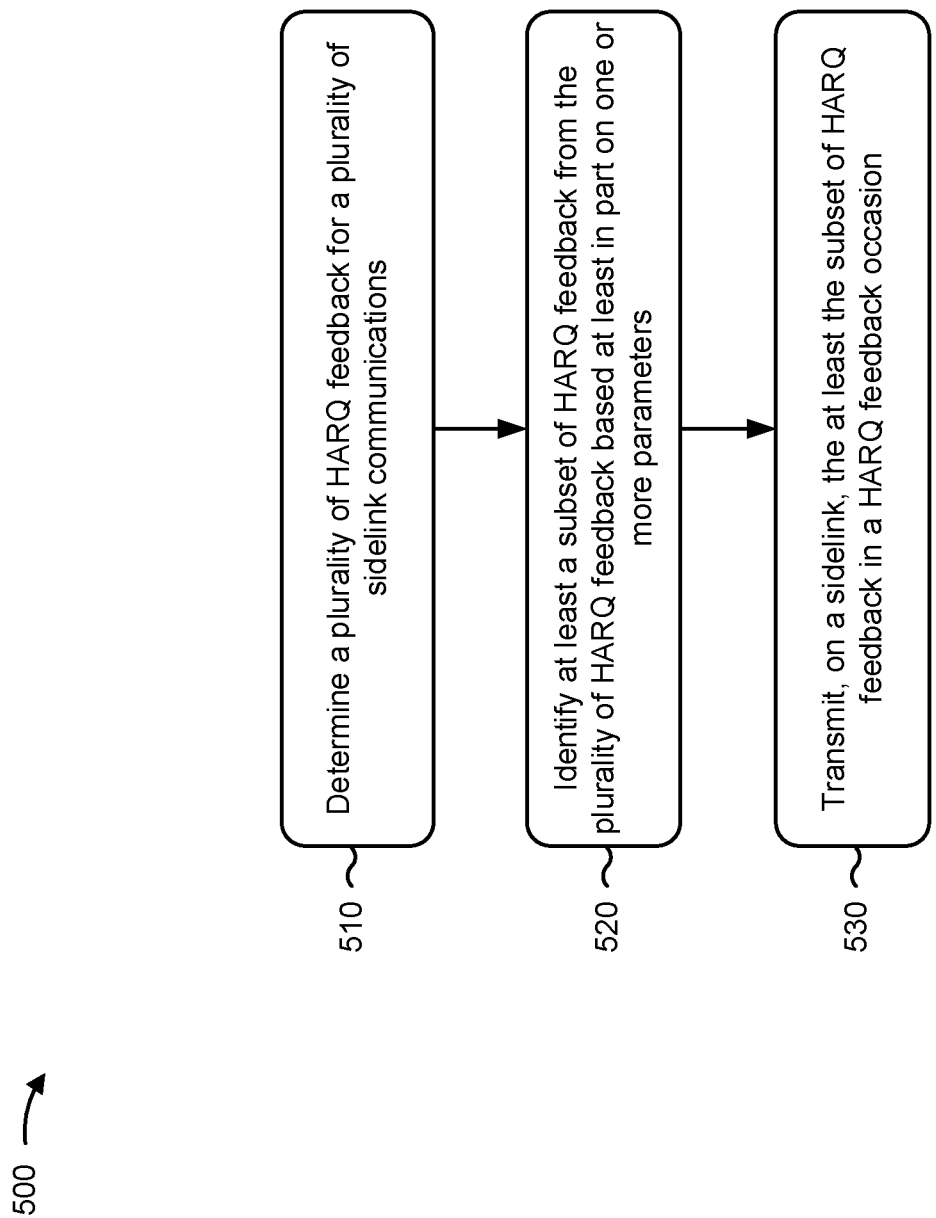

TECHNIQUES FOR TRANSMITTING SIDELINK HARQ FEEDBACK

CROSS-REFERENCE TO RELATED APPLICATION

This application claims priority to U.S. Provisional Patent Application No. 62/867,756, filed on Jun. 27, 2019, entitled "TECHNIQUES FOR TRANSMITTING SIDELINK HARQ FEEDBACK," which is hereby expressly incorporated by reference herein.

FIELD OF THE DISCLOSURE

Aspects of the present disclosure generally relate to wireless communication and to techniques for transmitting sidelink hybrid automatic repeat request (HARQ) feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a plurality of hybrid automatic repeat request (HARQ) feedback for a plurality of sidelink communications; identifying at least a subset of HARQ feedback from the plurality of HARQ feedback based at least in part on one or more parameters; and transmitting, on a sidelink, the at least the subset of HARQ feedback in a HARQ feedback occasion.

In a first aspect, identifying the at least the subset of HARQ feedback from the plurality of HARQ feedback comprises identifying the at least the subset of HARQ feedback from the plurality of HARQ feedback based at least in part on at least one of determining that the UE is not capable of transmitting all of the plurality of HARQ feedback in the HARQ feedback occasion, determining that the UE is not permitted to transmit all of the plurality of HARQ feedback in the HARQ feedback occasion, detecting a collision between two or more sidelink communications of the plurality of sidelink communications, or detecting a HARQ feedback collision in the HARQ feedback occasion. In a second aspect, alone or in combination with the first aspect, each HARQ feedback of the plurality of HARQ feedback comprises a NACK associated with a respective sidelink communication of the plurality of sidelink communications.

In a third aspect, alone or in combination with one or more of the first and second aspects, a HARQ feedback of the plurality of HARQ feedback comprises a NACK or an ACK associated with a respective sidelink communication of the plurality of sidelink communications. In a fourth aspect, alone or in combination with one or more of the first through third aspects, the method further comprises identifying the HARQ feedback occasion from a plurality of periodic HARQ feedback occasions based at least in part on a time-domain resource location of the plurality of sidelink communications and a HARQ feedback delay parameter. In a fifth aspect, alone or in combination with one or more of the first through fourth aspects, the method further comprises identifying, for the plurality of HARQ feedback, respective sets of subcarriers in the HARQ feedback occasion based at least in part on respective subchannels, of the sidelink, associated with the plurality of sidelink communications.

In a sixth aspect, alone or in combination with one or more of the first through fifth aspects, the one or more parameters comprise at least one of a priority associated with the plurality of sidelink communications, a distance between the UE and one or more other UEs, one or more signal measurements associated with the one or more UEs, a frequency-domain location of the plurality of HARQ feedback, or a transmission mode associated with the plurality of sidelink communications. In a seventh aspect, alone or in combination with one or more of the first through sixth aspects, the one or more parameters comprise a priority associated with the plurality of sidelink communications, a priority associated with a first sidelink communication of the plurality of sidelink communications is higher relative to a priority associated with a second sidelink communication of the plurality of sidelink communications, and identifying the at least the subset of HARQ feedback from the plurality of HARQ feedback comprises identifying the first HARQ feedback based at least in part on determining that the priority associated with the first sidelink communication is higher relative to the priority associated with the second sidelink communication.

In an eighth aspect, alone or in combination with one or more of the first through seventh aspects, the priority associated with the first sidelink communication is indicated in sidelink control information (SCI) associated with the first sidelink communication. In a ninth aspect, alone or in combination with one or more of the first through eighth aspects, the one or more parameters comprise a priority associated with the plurality of sidelink communications, and a distance between the UE and one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a distance between the UE and a first other UE of the one or more other UEs is shorter relative to a distance between the UE and a second other UE of the one or more other UEs and identifying the first HARQ feedback or the second HARQ feedback based at least in part on determining whether the distance between the UE and the first other UE is shorter relative to the distance between the UE and the second other UE.

In a tenth aspect, alone or in combination with one or more of the first through ninth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In an eleventh aspect, alone or in combination with one or more of the first through tenth aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twelfth aspect, alone or in combination with one or more of the first through eleventh aspects, the one or more parameters comprise a priority associated with the plurality of sidelink communications, and one or more measurements associated with one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a signal strength measurement associated with a first other UE of the one or more other UEs is greater relative to a signal strength measurement associated with a second other UE of the one or more other UEs and identifying the first HARQ feedback or the second HARQ feedback based at least in part on determining whether the signal strength measurement associated with the first other UE is greater relative to the signal strength measurement associated with the second other UE.

In a thirteenth aspect, alone or in combination with one or more of the first through twelfth aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a fourteenth aspect, alone or in combination with one or more of the first through thirteenth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a fifteenth aspect, alone or in combination with one or more of the first through fourteenth aspects, the one or more parameters comprise a priority associated with the plurality of sidelink communications, and a transmission mode associated with the plurality of sidelink communications, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises identifying, based at least in part on determining that the priority associated with the first sidelink communication and the priority associated with the second sidelink communication are the same priority, the first HARQ feedback or the second HARQ feedback based at least in part on a transmission mode associated with the first sidelink communication and a transmission mode associated with the second sidelink communication. In a sixteenth aspect, alone or in combination with one or more of the first through fifteenth aspects, the transmission mode associated with the first sidelink communication and the transmission mode associated with the second sidelink communication comprise at least one of a unicast transmission mode, a groupcast transmission mode, a multicast transmission mode, or a broadcast transmission mode.

In a seventeenth aspect, alone or in combination with one or more of the first through sixteenth aspects, the one or more parameters comprise a priority associated with the plurality of sidelink communications, and a frequency-domain location of the plurality of HARQ feedback, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether the first HARQ feedback or the second HARQ feedback minimizes a number of HARQ feedback clusters in the HARQ feedback occasion and identifying the first HARQ feedback or the second HARQ feedback based at least in part on determining whether the first HARQ feedback or the second HARQ feedback minimizes the number of HARQ feedback clusters in the HARQ feedback occasion.

In an eighteenth aspect, alone or in combination with one or more of the first through seventeenth aspects, the one or more parameters comprise a transmission mode associated with the plurality of sidelink communications, and identifying the at least the subset of HARQ feedback from the plurality of HARQ feedback comprises identifying a first HARQ feedback from the plurality of HARQ feedback or a second HARQ feedback from the plurality of HARQ feedback based at least in part on a transmission mode associated with a first sidelink communication, of the plurality of sidelink communications, associated with the first HARQ feedback and a transmission mode associated with a second sidelink communication, of the plurality of sidelink communications, associated with the second HARQ feedback.

In a nineteenth aspect, alone or in combination with one or more of the first through eighteenth aspects, the one or more parameters comprise a transmission mode associated with the plurality of sidelink communications, and a priority associated with the plurality of sidelink communications, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises identifying, based at least in part on determining that the transmission mode associated with the first sidelink communication and the transmission mode associated with the second sidelink communication are the same transmission mode, the first HARQ feedback or the second HARQ feedback based at least in part on a priority associated with the first sidelink communication and a priority associated with the second sidelink communication.

In a twentieth aspect, alone or in combination with one or more of the first through nineteenth aspects, the one or more parameters comprise a transmission mode associated with the plurality of sidelink communications, and a distance between the UE and one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a distance between the UE and a first other UE of the one or more other UEs is shorter relative to a distance between the UE and a second other UE of the one or more other UEs and identifying the first HARQ feedback or the second HARQ feedback based at least in part on determining whether the distance between the UE and the first other UE is shorter relative to the distance between the UE and the second other UE.

In a twenty-first aspect, alone or in combination with one or more of the first through twentieth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In a twenty-second aspect, alone or in combination with one or more of the first through twenty-first aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twenty-third aspect, alone or in combination with one or more of the first through twenty-second aspects, the one or more parameters comprise a transmission mode associated with the plurality of sidelink communications, and one or more measurements associated with one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a signal strength measurement associated with a first other UE of the one or more other UEs is greater relative to a signal strength measurement associated with a second other UE of the one or more other UEs and identifying the first HARQ feedback or the second HARQ feedback based at least in part on determining whether the signal strength measurement associated with the first other UE is greater relative to the signal strength measurement associated with the second other UE.

In a twenty-fourth aspect, alone or in combination with one or more of the first through twenty-third aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a twenty-fifth aspect, alone or in combination with one or more of the first through twenty-fourth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a twenty-sixth aspect, alone or in combination with one or more of the first through twenty-fifth aspects, the one or more parameters include a priority associated with the plurality of sidelink communications, and a respective priority, associated with each of the plurality of sidelink communications, is indicated in a respective SCI associated with each of the plurality of sidelink communications. In a twenty-seventh aspect, alone or in combination with one or more of the first through twenty-sixth aspects, the one or more parameters include respective priorities associated with each of the plurality of sidelink communications, and identifying the at least the subset of HARQ feedback comprises identifying, for the at least the subset of HARQ feedback, HARQ feedback associated with a first sidelink communication, of the plurality of sidelink communications, having a highest priority, and identifying for the at least the subset of HARQ feedback, HARQ feedback associated with one or more second sidelink communications, of the plurality of sidelink communications, in an order of decreasing priority until the at least the subset of HARQ feedback fills a number of HARQ feedback that the UE is capable of transmitting in the HARQ feedback occasion.

In some aspects, a UE for wireless communication may include memory and one or more processors operatively coupled to the memory. The memory and the one or more processors may be configured to determine a plurality of HARQ feedback for a plurality of sidelink communications; identify at least a subset of HARQ feedback from the plurality of HARQ feedback based at least in part on one or more parameters; and transmit, on a sidelink, the at least the subset of HARQ feedback in a HARQ feedback occasion.

In a first aspect, identifying the at least the subset of HARQ feedback from the plurality of HARQ feedback comprises identifying the at least the subset of HARQ feedback from the plurality of HARQ feedback based at least in part on at least one of determining that the UE is not capable of transmitting all of the plurality of HARQ feedback in the HARQ feedback occasion, determining that the UE is not permitted to transmit all of the plurality of HARQ feedback in the HARQ feedback occasion, detecting a collision between two or more sidelink communications of the plurality of sidelink communications, or detecting a HARQ feedback collision in the HARQ feedback occasion. In a second aspect, alone or in combination with the first aspect, each HARQ feedback of the plurality of HARQ feedback comprises a NACK associated with a respective sidelink communication of the plurality of sidelink communications.

In a third aspect, alone or in combination with one or more of the first and second aspects, a HARQ feedback of the plurality of HARQ feedback comprises a NACK or an ACK associated with a respective sidelink communication of the plurality of sidelink communications. In a fourth aspect, alone or in combination with one or more of the first through third aspects, the one or more processors are further to identify the HARQ feedback occasion from a plurality of periodic HARQ feedback occasions based at least in part on a time-domain resource location of the plurality of sidelink communications and a HARQ feedback delay parameter. In a fifth aspect, alone or in combination with one or more of the first through fourth aspects, the one or more processors are further to identify, for the plurality of HARQ feedback, respective sets of subcarriers in the HARQ feedback occasion based at least in part on respective subchannels, of the sidelink, associated with the plurality of sidelink communications.

In a sixth aspect, alone or in combination with one or more of the first through fifth aspects, the one or more parameters comprise at least one of a priority associated with the plurality of sidelink communications, a distance between the UE and the one or more other UEs, one or more signal measurements associated with the one or more UEs, a frequency-domain location of the plurality of HARQ feedback, or a transmission mode associated with the plurality of sidelink communications. In a seventh aspect, alone or in combination with one or more of the first through sixth aspects, the one or more parameters comprise a priority associated with the plurality of sidelink communications, a priority associated with a first sidelink communication of the plurality of sidelink communications is higher relative to a priority associated with a second sidelink communication of the plurality of sidelink communications, and identifying the at least the subset of HARQ feedback from the plurality of HARQ feedback comprises identifying the first HARQ feedback based at least in part on determining that the priority associated with the first sidelink communication is higher relative to the priority associated with the second sidelink communication.

In an eighth aspect, alone or in combination with one or more of the first through seventh aspects, the priority associated with the first sidelink communication is indicated in SCI associated with the first sidelink communication. In a ninth aspect, alone or in combination with one or more of the first through eighth aspects, the one or more parameters comprise a priority associated with the plurality of sidelink communications, and a distance between the UE and the one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a distance between the UE and a first other UE of the one or more other UEs is shorter relative to a distance between the UE and a second other UE of the one or more other UEs and identifying the first HARQ feedback or the second HARQ feedback based at least in part on determining whether the distance between the UE and the first other UE is shorter relative to the distance between the UE and the second other UE.

In a tenth aspect, alone or in combination with one or more of the first through ninth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In an eleventh aspect, alone or in combination with one or more of the first through tenth aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twelfth aspect, alone or in combination with one or more of the first through eleventh aspects, the one or more parameters comprise a priority associated with the plurality of sidelink communications, and one or more measurements associated with the one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a signal strength measurement associated with a first other UE of the one or more other UEs is greater relative to a signal strength measurement associated with a second other UE of the one or more other UEs and identifying the first HARQ feedback or the second HARQ feedback based at least in part on determining whether the signal strength measurement associated with the first other UE is greater relative to the signal strength measurement associated with the second other UE.

In a thirteenth aspect, alone or in combination with one or more of the first through twelfth aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a fourteenth aspect, alone or in combination with one or more of the first through thirteenth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a fifteenth aspect, alone or in combination with one or more of the first through fourteenth aspects, the one or more parameters comprise a priority associated with the plurality of sidelink communications, and a transmission mode associated with the plurality of sidelink communications, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises identifying, based at least in part on determining that the priority associated with the first sidelink communication and the priority associated with the second sidelink communication are the same priority, the first HARQ feedback or the second HARQ feedback based at least in part on a transmission mode associated with the first sidelink communication and a transmission mode associated with the second sidelink communication. In a sixteenth aspect, alone or in combination with one or more of the first through fifteenth aspects, the transmission mode associated with the first sidelink communication and the transmission mode associated with the second sidelink communication comprise at least one of a unicast transmission mode, a groupcast transmission mode, a multicast transmission mode, or a broadcast transmission mode.

In a seventeenth aspect, alone or in combination with one or more of the first through sixteenth aspects, the one or more parameters comprise a priority associated with the plurality of sidelink communications, and a frequency-domain location of the plurality of HARQ feedback, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether the first HARQ feedback or the second HARQ feedback minimizes a number of HARQ feedback clusters in the HARQ feedback occasion and identifying the first HARQ feedback or the second HARQ feedback based at least in part on determining whether the first HARQ feedback or the second HARQ feedback minimizes the number of HARQ feedback clusters in the HARQ feedback occasion.

In an eighteenth aspect, alone or in combination with one or more of the first through seventeenth aspects, the one or more parameters comprise a transmission mode associated with the plurality of sidelink communications, and identifying the at least the subset of HARQ feedback from the plurality of HARQ feedback comprises identifying a first HARQ feedback from the plurality of HARQ feedback or a second HARQ feedback from the plurality of HARQ feedback based at least in part on a transmission mode associated with a first sidelink communication, of the plurality of sidelink communications, associated with the first HARQ feedback and a transmission mode associated with a second sidelink communication, of the plurality of sidelink communications, associated with the second HARQ feedback.

In a nineteenth aspect, alone or in combination with one or more of the first through eighteenth aspects, the one or more parameters comprise a transmission mode associated with the plurality of sidelink communications, and a priority associated with the plurality of sidelink communications, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises identifying, based at least in part on determining that the transmission mode associated with the first sidelink communication and the transmission mode associated with the second sidelink communication are the same transmission mode, the first HARQ feedback or the second HARQ feedback based at least in part on a priority associated with the first sidelink communication and a priority associated with the second sidelink communication.

In a twentieth aspect, alone or in combination with one or more of the first through nineteenth aspects, the one or more parameters comprise a transmission mode associated with the plurality of sidelink communications, and a distance between the UE and the one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a distance between the UE and a first other UE of the one or more other UEs is shorter relative to a distance between the UE and a second other UE of the one or more other UEs and identifying the first HARQ feedback or the second HARQ feedback based at least in part on determining whether the distance between the UE and the first other UE is shorter relative to the distance between the UE and the second other UE.

In a twenty-first aspect, alone or in combination with one or more of the first through twentieth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In a twenty-second aspect, alone or in combination with one or more of the first through twenty-first aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twenty-third aspect, alone or in combination with one or more of the first through twenty-second aspects, the one or more parameters comprise a transmission mode associated with the plurality of sidelink communications, and one or more measurements associated with the one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a signal strength measurement associated with a first other UE of the one or more other UEs is greater relative to a signal strength measurement associated with a second other UE of the one or more other UEs and identifying the first HARQ feedback or the second HARQ feedback based at least in part on determining whether the signal strength measurement associated with the first other UE is greater relative to the signal strength measurement associated with the second other UE.

In a twenty-fourth aspect, alone or in combination with one or more of the first through twenty-third aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a twenty-fifth aspect, alone or in combination with one or more of the first through twenty-fourth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a twenty-sixth aspect, alone or in combination with one or more of the first through twenty-fifth aspects, the one or more parameters include a priority associated with the plurality of sidelink communications, and a respective priority, associated with each of the plurality of sidelink communications, is indicated in a respective SCI associated with each of the plurality of sidelink communications. In a twenty-seventh aspect, alone or in combination with one or more of the first through twenty-sixth aspects, the one or more parameters include respective priorities associated with each of the plurality of sidelink communications, and identifying the at least the subset of HARQ feedback comprises identifying, for the at least the subset of HARQ feedback, HARQ feedback associated with a first sidelink communication, of the plurality of sidelink communications, having a highest priority, and identifying for the at least the subset of HARQ feedback, HARQ feedback associated with one or more second sidelink communications, of the plurality of sidelink communications, in an order of decreasing priority until the at least the subset of HARQ feedback fills a number of HARQ feedback that the UE is capable of transmitting in the HARQ feedback occasion.

In some aspects, a non-transitory computer-readable medium may store one or more instructions for wireless communication. The one or more instructions, when executed by one or more processors of a UE, may cause the one or more processors to determine a plurality of HARQ feedback for a plurality of sidelink communications; identify at least a subset of HARQ feedback from the plurality of HARQ feedback based at least in part on one or more parameters; and transmit, on a sidelink, the at least the subset of HARQ feedback in a HARQ feedback occasion.

In a first aspect, identifying the at least the subset of HARQ feedback from the plurality of HARQ feedback comprises identifying the at least the subset of HARQ feedback from the plurality of HARQ feedback based at least in part on at least one of determining that the UE is not capable of transmitting all of the plurality of HARQ feedback in the HARQ feedback occasion, determining that the UE is not permitted to transmit all of the plurality of HARQ feedback in the HARQ feedback occasion, detecting a collision between two or more sidelink communications of the plurality of sidelink communications, or detecting a HARQ feedback collision in the HARQ feedback occasion. In a second aspect, alone or in combination with the first aspect, each HARQ feedback of the plurality of HARQ feedback comprises a NACK associated with a respective sidelink communication of the plurality of sidelink communications.

In a third aspect, alone or in combination with one or more of the first and second aspects, a HARQ feedback of the plurality of HARQ feedback comprises a NACK or an ACK associated with a respective sidelink communication of the plurality of sidelink communications. In a fourth aspect, alone or in combination with one or more of the first through third aspects, the one or more instructions, when executed by the one or more processors, cause the one or more processors to identify the HARQ feedback occasion from a plurality of periodic HARQ feedback occasions based at least in part on a time-domain resource location of the plurality of sidelink communications and a HARQ feedback delay parameter. In a fifth aspect, alone or in combination with one or more of the first through fourth aspects, the one or more instructions, when executed by the one or more processors, cause the one or more processors to identify, for the plurality of HARQ feedback, respective sets of subcarriers in the HARQ feedback occasion based at least in part on respective subchannels, of the sidelink, associated with the plurality of sidelink communications.

In a sixth aspect, alone or in combination with one or more of the first through fifth aspects, the one or more parameters comprise at least one of a priority associated with the plurality of sidelink communications, a distance between the UE and the one or more other UEs, one or more signal measurements associated with the one or more UEs, a frequency-domain location of the plurality of HARQ feedback, or a transmission mode associated with the plurality of sidelink communications. In a seventh aspect, alone or in combination with one or more of the first through sixth aspects, the one or more parameters comprise a priority associated with the plurality of sidelink communications, a priority associated with a first sidelink communication of the plurality of sidelink communications is higher relative to a priority associated with a second sidelink communication of the plurality of sidelink communications, and identifying the at least the subset of HARQ feedback from the plurality of HARQ feedback comprises identifying the first HARQ feedback based at least in part on determining that the priority associated with the first sidelink communication is higher relative to the priority associated with the second sidelink communication.

In an eighth aspect, alone or in combination with one or more of the first through seventh aspects, the priority associated with the first sidelink communication is indicated in SCI associated with the first sidelink communication. In a ninth aspect, alone or in combination with one or more of the first through eighth aspects, the one or more parameters comprise a priority associated with the plurality of sidelink communications, and a distance between the UE and the one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a distance between the UE and a first other UE of the one or more other UEs is shorter relative to a distance between the UE and a second other UE of the one or more other UEs and identifying the first HARQ feedback or the second HARQ feedback based at least in part on determining whether the distance between the UE and the first other UE is shorter relative to the distance between the UE and the second other UE.

In a tenth aspect, alone or in combination with one or more of the first through ninth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In an eleventh aspect, alone or in combination with one or more of the first through tenth aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twelfth aspect, alone or in combination with one or more of the first through eleventh aspects, the one or more parameters comprise a priority associated with the plurality of sidelink communications, and one or more measurements associated with the one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a signal strength measurement associated with a first other UE of the one or more other UEs is greater relative to a signal strength measurement associated with a second other UE of the one or more other UEs and identifying the first HARQ feedback or the second HARQ feedback based at least in part on determining whether the signal strength measurement associated with the first other UE is greater relative to the signal strength measurement associated with the second other UE.

In a thirteenth aspect, alone or in combination with one or more of the first through twelfth aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a fourteenth aspect, alone or in combination with one or more of the first through thirteenth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a fifteenth aspect, alone or in combination with one or more of the first through fourteenth aspects, the one or more parameters comprise a priority associated with the plurality of sidelink communications, and a transmission mode associated with the plurality of sidelink communications, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises identifying, based at least in part on determining that the priority associated with the first sidelink communication and the priority associated with the second sidelink communication are the same priority, the first HARQ feedback or the second HARQ feedback based at least in part on a transmission mode associated with the first sidelink communication and a transmission mode associated with the second sidelink communication. In a sixteenth aspect, alone or in combination with one or more of the first through fifteenth aspects, the transmission mode associated with the first sidelink communication and the transmission mode associated with the second sidelink communication comprise at least one of a unicast transmission mode, a groupcast transmission mode, a multicast transmission mode, or a broadcast transmission mode.

In a seventeenth aspect, alone or in combination with one or more of the first through sixteenth aspects, the one or more parameters comprise a priority associated with the plurality of sidelink communications, and a frequency-domain location of the plurality of HARQ feedback, a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether the first HARQ feedback or the second HARQ feedback minimizes a number of HARQ feedback clusters in the HARQ feedback occasion and identifying the first HARQ feedback or the second HARQ feedback based at least in part on determining whether the first HARQ feedback or the second HARQ feedback minimizes the number of HARQ feedback clusters in the HARQ feedback occasion.

In an eighteenth aspect, alone or in combination with one or more of the first through seventeenth aspects, the one or more parameters comprise a transmission mode associated with the plurality of sidelink communications, and identifying the at least the subset of HARQ feedback from the plurality of HARQ feedback comprises identifying a first HARQ feedback from the plurality of HARQ feedback or a second HARQ feedback from the plurality of HARQ feedback based at least in part on a transmission mode associated with a first sidelink communication, of the plurality of sidelink communications, associated with the first HARQ feedback and a transmission mode associated with a second sidelink communication, of the plurality of sidelink communications, associated with the second HARQ feedback.

In a nineteenth aspect, alone or in combination with one or more of the first through eighteenth aspects, the one or more parameters comprise a transmission mode associated with the plurality of sidelink communications, and a priority associated with the plurality of sidelink communications, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises identifying, based at least in part on determining that the transmission mode associated with the first sidelink communication and the transmission mode associated with the second sidelink communication are the same transmission mode, the first HARQ feedback or the second HARQ feedback based at least in part on a priority associated with the first sidelink communication and a priority associated with the second sidelink communication.

In a twentieth aspect, alone or in combination with one or more of the first through nineteenth aspects, the one or more parameters comprise a transmission mode associated with the plurality of sidelink communications, and a distance between the UE and the one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a distance between the UE and a first other UE of the one or more other UEs is shorter relative to a distance between the UE and a second other UE of the one or more other UEs and identifying the first HARQ feedback or the second HARQ feedback based at least in part on determining whether the distance between the UE and the first other UE is shorter relative to the distance between the UE and the second other UE.

In a twenty-first aspect, alone or in combination with one or more of the first through twentieth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In a twenty-second aspect, alone or in combination with one or more of the first through twenty-first aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twenty-third aspect, alone or in combination with one or more of the first through twenty-second aspects, the one or more parameters comprise a transmission mode associated with the plurality of sidelink communications, and one or more measurements associated with the one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a signal strength measurement associated with a first other UE of the one or more other UEs is greater relative to a signal strength measurement associated with a second other UE of the one or more other UEs and identifying the first HARQ feedback or the second HARQ feedback based at least in part on determining whether the signal strength measurement associated with the first other UE is greater relative to the signal strength measurement associated with the second other UE.

In a twenty-fourth aspect, alone or in combination with one or more of the first through twenty-third aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a twenty-fifth aspect, alone or in combination with one or more of the first through twenty-fourth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a twenty-sixth aspect, alone or in combination with one or more of the first through twenty-fifth aspects, the one or more parameters include a priority associated with the plurality of sidelink communications, and a respective priority, associated with each of the plurality of sidelink communications, is indicated in a respective SCI associated with each of the plurality of sidelink communications. In a twenty-seventh aspect, alone or in combination with one or more of the first through twenty-sixth aspects, the one or more parameters include respective priorities associated with each of the plurality of sidelink communications, and identifying the at least the subset of HARQ feedback comprises identifying, for the at least the subset of HARQ feedback, HARQ feedback associated with a first sidelink communication, of the plurality of sidelink communications, having a highest priority, and identifying for the at least the subset of HARQ feedback, HARQ feedback associated with one or more second sidelink communications, of the plurality of sidelink communications, in an order of decreasing priority until the at least the subset of HARQ feedback fills a number of HARQ feedback that the UE is capable of transmitting in the HARQ feedback occasion.

In some aspects, an apparatus for wireless communication may include means for determining a plurality of HARQ feedback for a plurality of sidelink communications; means for identifying at least a subset of HARQ feedback from the plurality of HARQ feedback based at least in part on one or more parameters; and means for transmitting, on a sidelink, the at least the subset of HARQ feedback in a HARQ feedback occasion.

In a first aspect, identifying the at least the subset of HARQ feedback from the plurality of HARQ feedback comprises identifying the at least the subset of HARQ feedback from the plurality of HARQ feedback based at least in part on at least one of determining that the UE is not capable of transmitting all of the plurality of HARQ feedback in the HARQ feedback occasion, determining that the UE is not permitted to transmit all of the plurality of HARQ feedback in the HARQ feedback occasion, detecting a collision between two or more sidelink communications of the plurality of sidelink communications, or detecting a HARQ feedback collision in the HARQ feedback occasion. In a second aspect, alone or in combination with the first aspect, each HARQ feedback of the plurality of HARQ feedback comprises a NACK associated with a respective sidelink communication of the plurality of sidelink communications.

In a third aspect, alone or in combination with one or more of the first and second aspects, a HARQ feedback of the plurality of HARQ feedback comprises a NACK or an ACK associated with a respective sidelink communication of the plurality of sidelink communications. In a fourth aspect, alone or in combination with one or more of the first through third aspects, the apparatus include means for identifying the HARQ feedback occasion from a plurality of periodic HARQ feedback occasions based at least in part on a time-domain resource location of the plurality of sidelink communications and a HARQ feedback delay parameter. In a fifth aspect, alone or in combination with one or more of the first through fourth aspects, the apparatus includes means for identifying, for the plurality of HARQ feedback, respective sets of subcarriers in the HARQ feedback occasion based at least in part on respective subchannels, of the sidelink, associated with the plurality of sidelink communications.

In a sixth aspect, alone or in combination with one or more of the first through fifth aspects, the one or more parameters comprise at least one of a priority associated with the plurality of sidelink communications, a distance between the UE and the one or more other UEs, one or more signal measurements associated with the one or more UEs, a frequency-domain location of the plurality of HARQ feedback, or a transmission mode associated with the plurality of sidelink communications. In a seventh aspect, alone or in combination with one or more of the first through sixth aspects, the one or more parameters comprise a priority associated with the plurality of sidelink communications, a priority associated with a first sidelink communication of the plurality of sidelink communications is higher relative to a priority associated with a second sidelink communication of the plurality of sidelink communications, and identifying the at least the subset of HARQ feedback from the plurality of HARQ feedback comprises identifying the first HARQ feedback based at least in part on determining that the priority associated with the first sidelink communication is higher relative to the priority associated with the second sidelink communication.

In an eighth aspect, alone or in combination with one or more of the first through seventh aspects, the priority associated with the first sidelink communication is indicated in SCI associated with the first sidelink communication. In a ninth aspect, alone or in combination with one or more of the first through eighth aspects, the one or more parameters comprise a priority associated with the plurality of sidelink communications, and a distance between the UE and the one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a distance between the UE and a first other UE of the one or more other UEs is shorter relative to a distance between the UE and a second other UE of the one or more other UEs and identifying the first HARQ feedback or the second HARQ feedback based at least in part on determining whether the distance between the UE and the first other UE is shorter relative to the distance between the UE and the second other UE.

In a tenth aspect, alone or in combination with one or more of the first through ninth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In an eleventh aspect, alone or in combination with one or more of the first through tenth aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twelfth aspect, alone or in combination with one or more of the first through eleventh aspects, the one or more parameters comprise a priority associated with the plurality of sidelink communications, and one or more measurements associated with the one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a signal strength measurement associated with a first other UE of the one or more other UEs is greater relative to a signal strength measurement associated with a second other UE of the one or more other UEs and identifying the first HARQ feedback or the second HARQ feedback based at least in part on determining whether the signal strength measurement associated with the first other UE is greater relative to the signal strength measurement associated with the second other UE.

In a thirteenth aspect, alone or in combination with one or more of the first through twelfth aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a fourteenth aspect, alone or in combination with one or more of the first through thirteenth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a fifteenth aspect, alone or in combination with one or more of the first through fourteenth aspects, the one or more parameters comprise a priority associated with the plurality of sidelink communications, and a transmission mode associated with the plurality of sidelink communications, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises identifying, based at least in part on determining that the priority associated with the first sidelink communication and the priority associated with the second sidelink communication are the same priority, the first HARQ feedback or the second HARQ feedback based at least in part on a transmission mode associated with the first sidelink communication and a transmission mode associated with the second sidelink communication. In a sixteenth aspect, alone or in combination with one or more of the first through fifteenth aspects, the transmission mode associated with the first sidelink communication and the transmission mode associated with the second sidelink communication comprise at least one of a unicast transmission mode, a groupcast transmission mode, a multicast transmission mode, or a broadcast transmission mode.

In a seventeenth aspect, alone or in combination with one or more of the first through sixteenth aspects, the one or more parameters comprise a priority associated with the plurality of sidelink communications, and a frequency-domain location of the plurality of HARQ feedback, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether the first HARQ feedback or the second HARQ feedback minimizes a number of HARQ feedback clusters in the HARQ feedback occasion and identifying the first HARQ feedback or the second HARQ feedback based at least in part on determining whether the first HARQ feedback or the second HARQ feedback minimizes the number of HARQ feedback clusters in the HARQ feedback occasion.

In an eighteenth aspect, alone or in combination with one or more of the first through seventeenth aspects, the one or more parameters comprise a transmission mode associated with the plurality of sidelink communications, and identifying the at least the subset of HARQ feedback from the plurality of HARQ feedback comprises identifying a first HARQ feedback from the plurality of HARQ feedback or a second HARQ feedback from the plurality of HARQ feedback based at least in part on a transmission mode associated with a first sidelink communication, of the plurality of sidelink communications, associated with the first HARQ feedback and a transmission mode associated with a second sidelink communication, of the plurality of sidelink communications, associated with the second HARQ feedback.

In a nineteenth aspect, alone or in combination with one or more of the first through eighteenth aspects, the one or more parameters comprise a transmission mode associated with the plurality of sidelink communications, and a priority associated with the plurality of sidelink communications, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises identifying, based at least in part on determining that the transmission mode associated with the first sidelink communication and the transmission mode associated with the second sidelink communication are the same transmission mode, the first HARQ feedback or the second HARQ feedback based at least in part on a priority associated with the first sidelink communication and a priority associated with the second sidelink communication.

In a twentieth aspect, alone or in combination with one or more of the first through nineteenth aspects, the one or more parameters comprise a transmission mode associated with the plurality of sidelink communications, and a distance between the UE and the one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a distance between the UE and a first other UE of the one or more other UEs is shorter relative to a distance between the UE and a second other UE of the one or more other UEs and identifying the first HARQ feedback or the second HARQ feedback based at least in part on determining whether the distance between the UE and the first other UE is shorter relative to the distance between the UE and the second other UE.

In a twenty-first aspect, alone or in combination with one or more of the first through twentieth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In a twenty-second aspect, alone or in combination with one or more of the first through twenty-first aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twenty-third aspect, alone or in combination with one or more of the first through twenty-second aspects, the one or more parameters comprise a transmission mode associated with the plurality of sidelink communications, and one or more measurements associated with the one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a signal strength measurement associated with a first other UE of the one or more other UEs is greater relative to a signal strength measurement associated with a second other UE of the one or more other UEs and identifying the first HARQ feedback or the second HARQ feedback based at least in part on determining whether the signal strength measurement associated with the first other UE is greater relative to the signal strength measurement associated with the second other UE.

In a twenty-fourth aspect, alone or in combination with one or more of the first through twenty-third aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a twenty-fifth aspect, alone or in combination with one or more of the first through twenty-fourth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a twenty-sixth aspect, alone or in combination with one or more of the first through twenty-fifth aspects, the one or more parameters include a priority associated with the plurality of sidelink communications, and a respective priority, associated with each of the plurality of sidelink communications, is indicated in a respective SCI associated with each of the plurality of sidelink communications. In a twenty-seventh aspect, alone or in combination with one or more of the first through twenty-sixth aspects, the one or more parameters include respective priorities associated with each of the plurality of sidelink communications, and identifying the at least the subset of HARQ feedback comprises identifying, for the at least the subset of HARQ feedback, HARQ feedback associated with a first sidelink communication, of the plurality of sidelink communications, having a highest priority, and identifying for the at least the subset of HARQ feedback, HARQ feedback associated with one or more second sidelink communications, of the plurality of sidelink communications, in an order of decreasing priority until the at least the subset of HARQ feedback fills a number of HARQ feedback that the UE is capable of transmitting in the HARQ feedback occasion.

Aspects generally include a method, apparatus, system, computer program product, non-transitory computer-readable medium, user equipment, base station, wireless communication device, and/or processing system as substantially described herein with reference to and as illustrated by the accompanying drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4F are diagrams illustrating one or more examples of transmitting sidelink hybrid automatic repeat request (HARQ) feedback, in accordance with various aspects of the present disclosure.

FIG. 5 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
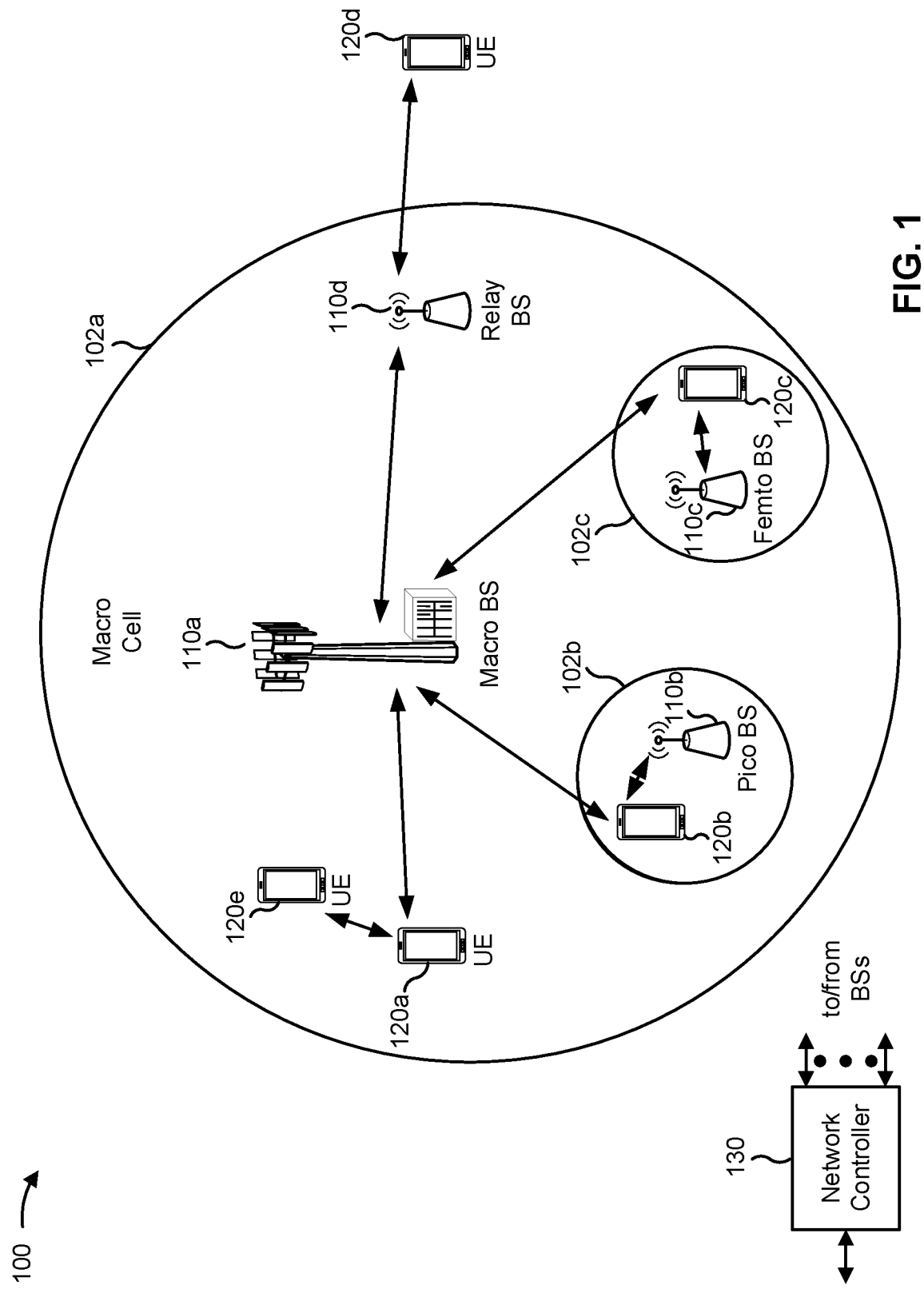
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may communicate with one or more BSs in wireless network 100, may communicate directly with another UE (e.g., UE 120a and UE 120e, as illustrated in FIG. 1) via a sidelink, and/or the like. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
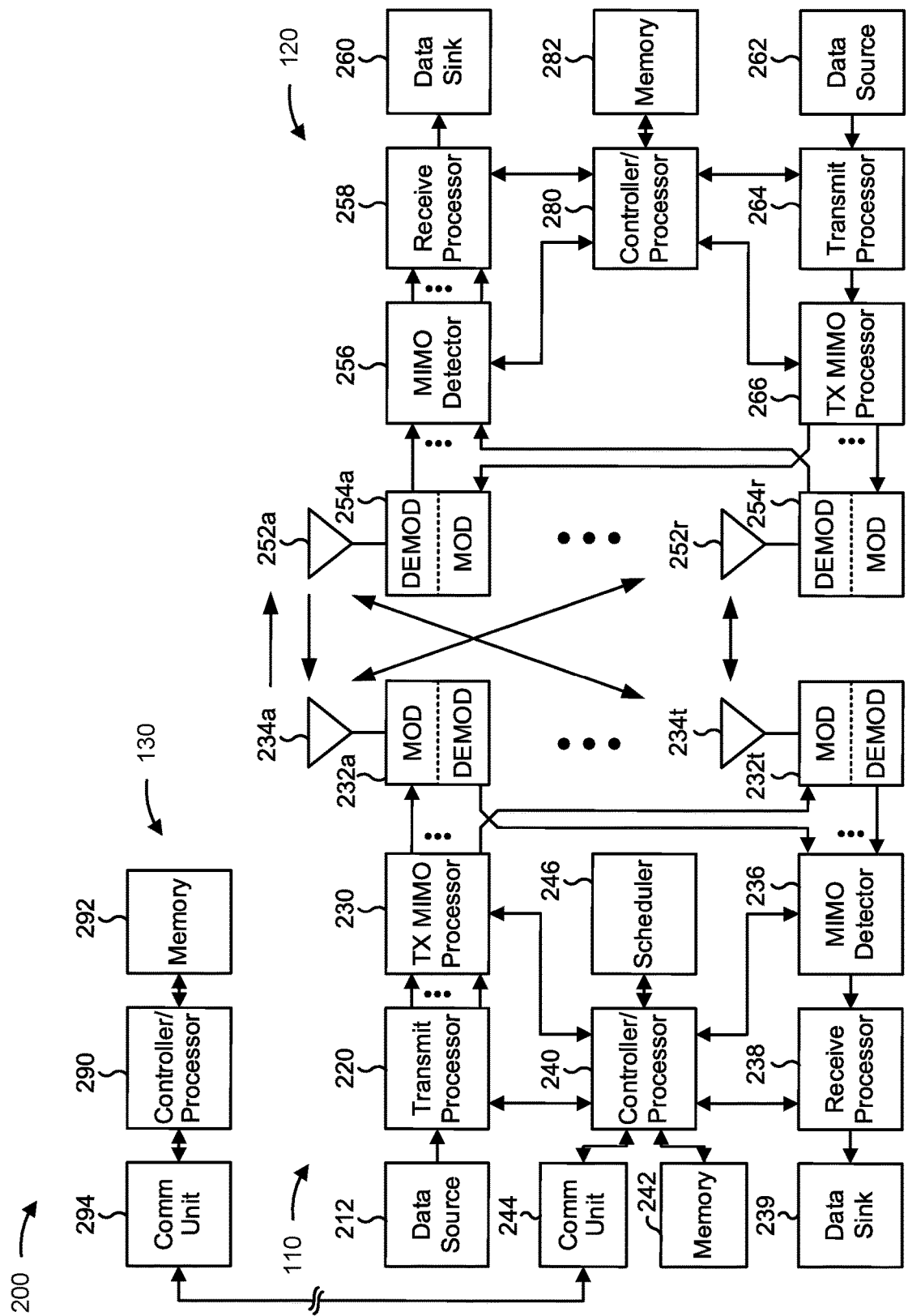
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmitting sidelink hybrid automatic repeat request (HARQ) feedback, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 500 of FIG. 5 and/or other processes as described herein. A scheduler 246 may schedule UEs for data transmission on the downlink and/or uplink.

In some aspects, UE 120 may include means for determining a plurality of HARQ feedback for a plurality of sidelink communications, means for identifying at least a subset of HARQ feedback from the plurality of HARQ feedback based at least in part on one or more parameters, means for transmitting, on a sidelink, the at least the subset of HARQ feedback in a HARQ feedback occasion, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
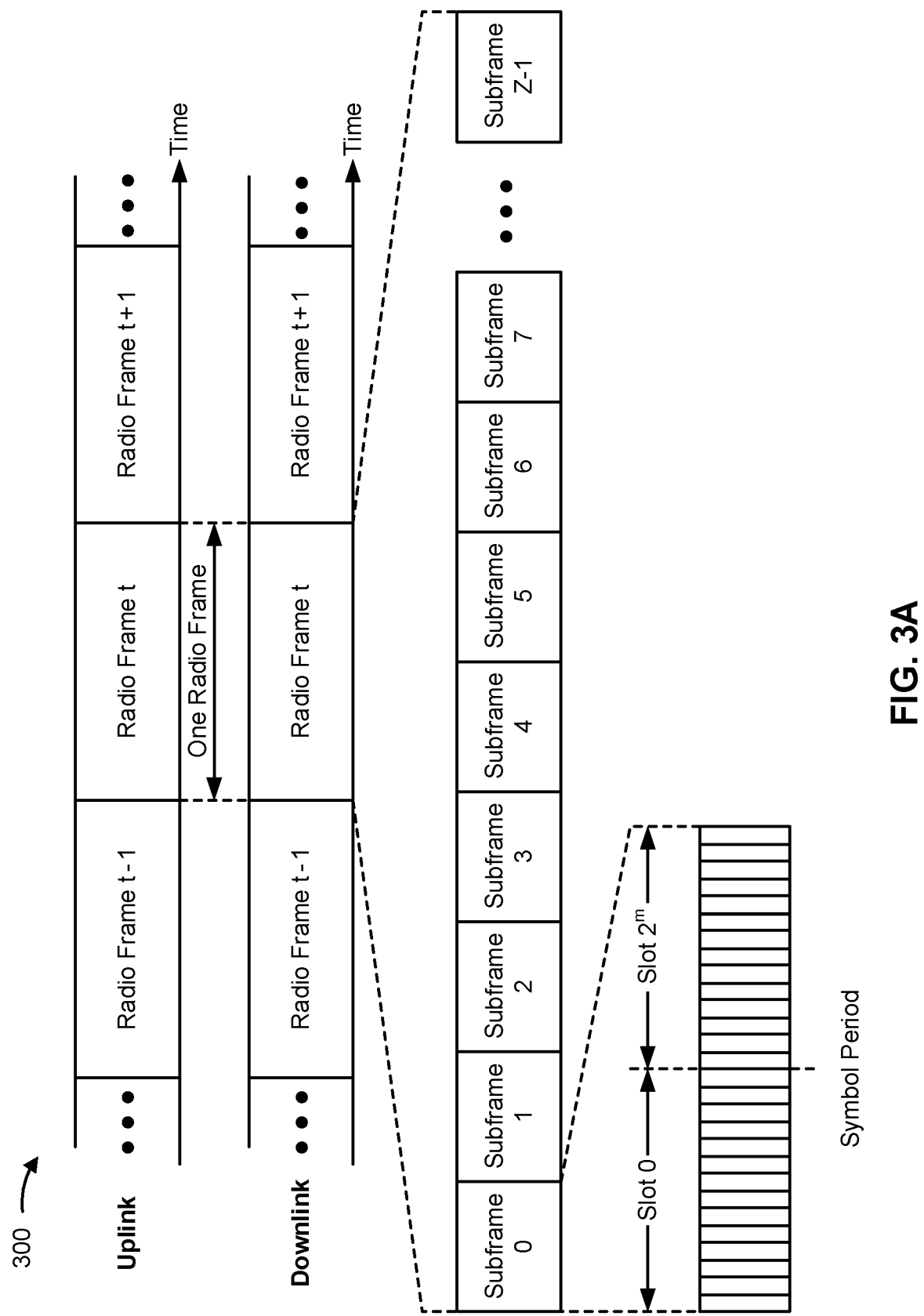
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a periodic time-bounded communication unit defined by a wireless communication standard and/or protocol may be referred to as a wireless communication structure. Additionally, or alternatively, different configurations of wireless communication structures than those shown in FIG. 3A may be used.

In some aspects, a UE (e.g., UE 120a, UE 120e, and/or the like) may transmit, to another UE (e.g., UE 120a, UE 120e, and/or the like) and on a sidelink, one or more sidelink communications. The UE may transmit the one or more sidelink communications in one or more slots included in a frame structure 300, in one or more subcarriers or subchannels included in a frame structure 300, and/or the like. In some aspects, the other UE may receive the one or more sidelink communications, may generate HARQ feedback for the one or more sidelink communications, may incorporate the HARQ feedback into one or more HARQ feedback communications, and may transmit, to the UE and on the sidelink, the one or more HARQ feedback communications in a reporting period or HARQ occasion, in a frame structure 300, configured for the sidelink.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
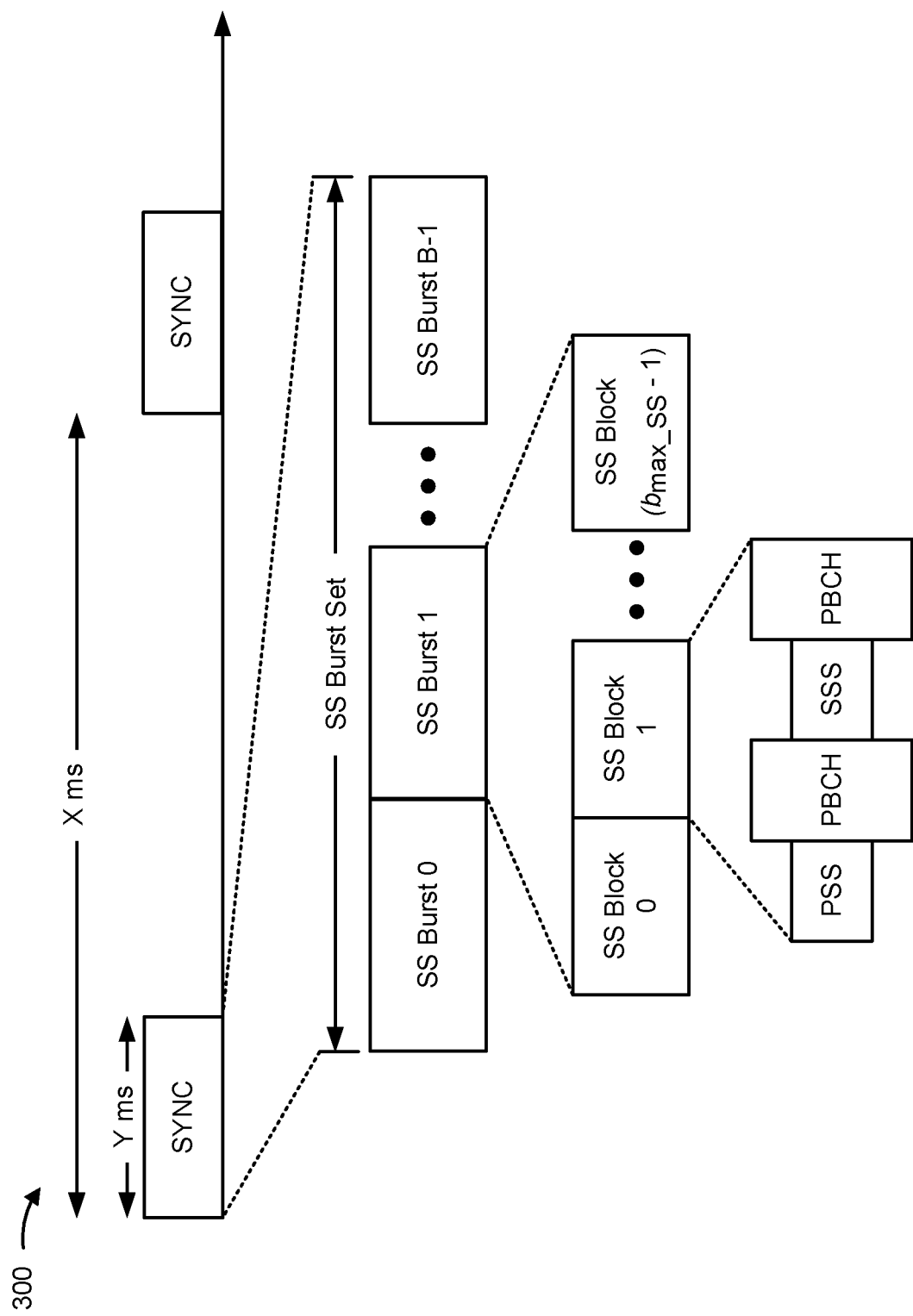
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

In some cases, two or more subordinate entities (e.g., UEs) may communicate with each other using sidelink signals. Real-world applications of such sidelink communications may include public safety, proximity services, UE-to-network relaying, V2X communications, Internet of Everything (IoE) communications, IoT communications, mission-critical mesh, and/or various other suitable applications. A communication that is transmitted from one subordinate entity (e.g., UE1) to another subordinate entity (e.g., UE2) without relaying that communication through a scheduling entity (e.g., UE or BS), even though the scheduling entity may be utilized for scheduling and/or control purposes, may be referred to as a sidelink communication. In some examples, a sidelink communication may be transmitted using a licensed frequency spectrum, an unlicensed frequency spectrum (e.g., an industrial, scientific and medical (ISM) radio band, such as 5 GHz, that is reserved for purposes other than cellular communication such as Wi-Fi).

In some cases, a UE may provide, to another UE, feedback associated with a sidelink communication that was received from the other UE on a sidelink between the UE and the other UE. The feedback may include, for example, HARQ feedback (e.g., an acknowledgment (ACK) or a negative acknowledgement (NACK) for the sidelink communication). The UE may transmit the HARQ feedback in one or more HARQ feedback communications on the sidelink. In some cases, a frame structure for the sidelink may include a HARQ feedback occasion that may be used for transmitting the one or more HARQ feedback communications. Unlike a cellular communication link with a BS, where the UE may provide HARQ feedback to a single BS, the UE may be permitted to provide HARQ feedback to a plurality of UEs on a sidelink in a HARQ feedback occasion. However, if the UE is scheduled to provide a greater quantity of HARQ feedback than the UE is capable and/or permitted to transmit in a HARQ feedback occasion, the UE may be unable to determine which HARQ feedback to transmit in the HARQ feedback occasion.

Some aspects described herein provide techniques and apparatuses for transmitting sidelink HARQ feedback. In some aspects, a UE may receive a plurality of sidelink communications on a sidelink. If the UE determines that the UE is not capable and/or permitted to transmit HARQ feedback for all of the sidelink communications in a HARQ feedback occasion, the UE may identify a subset of HARQ feedback to transmit in the HARQ feedback occasion using the techniques described herein. In this way, the UE is capable of multiplexing HARQ feedback in a HARQ feedback occasion, is capable of identifying subsets of HARQ feedback to multiplex in a HARQ feedback occasion, and/or the like.

FIGS. 4A-4F are diagrams illustrating one or more examples 400 of transmitting sidelink HARQ feedback, in accordance with various aspects of the present disclosure. As shown in FIGS. 4A-4F, examples 400 may include a plurality of UEs (e.g., UE 120), such as UE1 and UE2. However, in some aspects, a greater quantity of UEs may be included in examples 400. UE1 and UE2 may be included in a wireless network (e.g., wireless network 100) and may communicate via a sidelink. In some aspects, the sidelink may be configured with a frame structure, such as a frame structure 300 of FIG. 3A and/or another sidelink frame structure.

As shown in FIG. 4A, and by reference number 402, UE1 and UE2 may communicate via the sidelink by transmitting and/or receiving sidelink communications via the sidelink. For example, UE1 may receive a plurality of sidelink communications on the sidelink from one or more UEs that include UE2. In some aspects, UE1 may receive the plurality of sidelink communications on the sidelink from a plurality of UEs that include UE2. In this case, each UE of the plurality of UEs may transmit one or more sidelink communications of the plurality of the sidelink communications to UE1.

In some aspects, the plurality of sidelink communications may be transmitted on one or more channels or subchannels of the sidelink. In this case, each sidelink communication may be transmitted in one or more time-domain resources (e.g., across one or more slots, across one or more symbols, and/or the like) and/or in one or more frequency-domain resources (e.g., in a subchannel of the frequency bandwidth of the sidelink). In some aspects, a subchannel may include a plurality of subcarriers of the frequency bandwidth sidelink, one or more resource blocks of the frequency bandwidth of the sidelink, and/or the like.

As further shown in FIG. 4A, and by reference number 404, UE1 may determine a plurality of HARQ feedback for the plurality of sidelink communications. The HARQ feedback, for a sidelink communication, may include an ACK or NACK. An ACK may indicate, to the transmitter of the sidelink communication (e.g., UE2 or another UE), that the sidelink communication was successfully received and decoded. A NACK may indicate, to the transmitter of the sidelink communication (e.g., UE2 or another UE), that the sidelink communication was not successfully received and/or decoded. In some aspects, UE1 may determine the HARQ feedback to be an ACK if UE1 is capable of decoding both the control information (e.g., sidelink control information (SCI)) of the sidelink communication and the corresponding data of the sidelink communication. In some aspects, UE1 may determine the HARQ feedback to be a NACK if UE1 is not capable of decoding the control information (e.g., SCI) of the sidelink communication, the corresponding data of the sidelink communication, or both the control information and the corresponding data.

In some aspects, UE1 and UE2 may communicate using an ACK/NACK HARQ feedback configuration, in which a receiver UE (e.g., UE1 or UE2) is to transmit an ACK based at least in part on successfully receiving and decoding a sidelink communication from a transmitter UE (e.g., UE1 or UE2), and is to transmit a NACK for a sidelink communication that the receiver UE is unable to decode. In some aspects, UE1 and UE2 may communicate using a NACK-only HARQ feedback configuration, in which a transmitter UE (e.g., UE1 or UE2) does not transmit HARQ feedback for sidelink communications that are successfully received and decoded, and only transmits a NACK for sidelink communications that the receiver UE is unable to decode.

In some aspects, UE1 may be configured to provide HARQ feedback to UE2 based at least in part on whether a distance between UE1 and UE2 satisfies a distance threshold, and/or whether a signal strength measurement associated with UE2 satisfies a signal strength threshold. For example, UE1 may be configured to provide HARQ feedback to UE2 based at least in part on determining that the distance between UE1 and UE2 satisfies the distance threshold or does not satisfy the distance threshold. UE1 may determine the distance based at least in part on a round-trip time (RTT) and/or another type of distance measurement, may receive an indication of the distance from UE2 and/or another entity, may receive an indication of the location of UE2, and determine the distance based at least in part on the location of UE2 and the location of UE1, and/or the like. As another example, UE1 may be configured to provide HARQ feedback to UE2 based at least in part on determining that the signal strength measurement satisfies the signal strength threshold or does not satisfy the signal strength threshold. UE1 may perform one or more signal strength measurements, such as an RSRP measurement, an RSSI measurement, and/or the like.

Figure 4B:
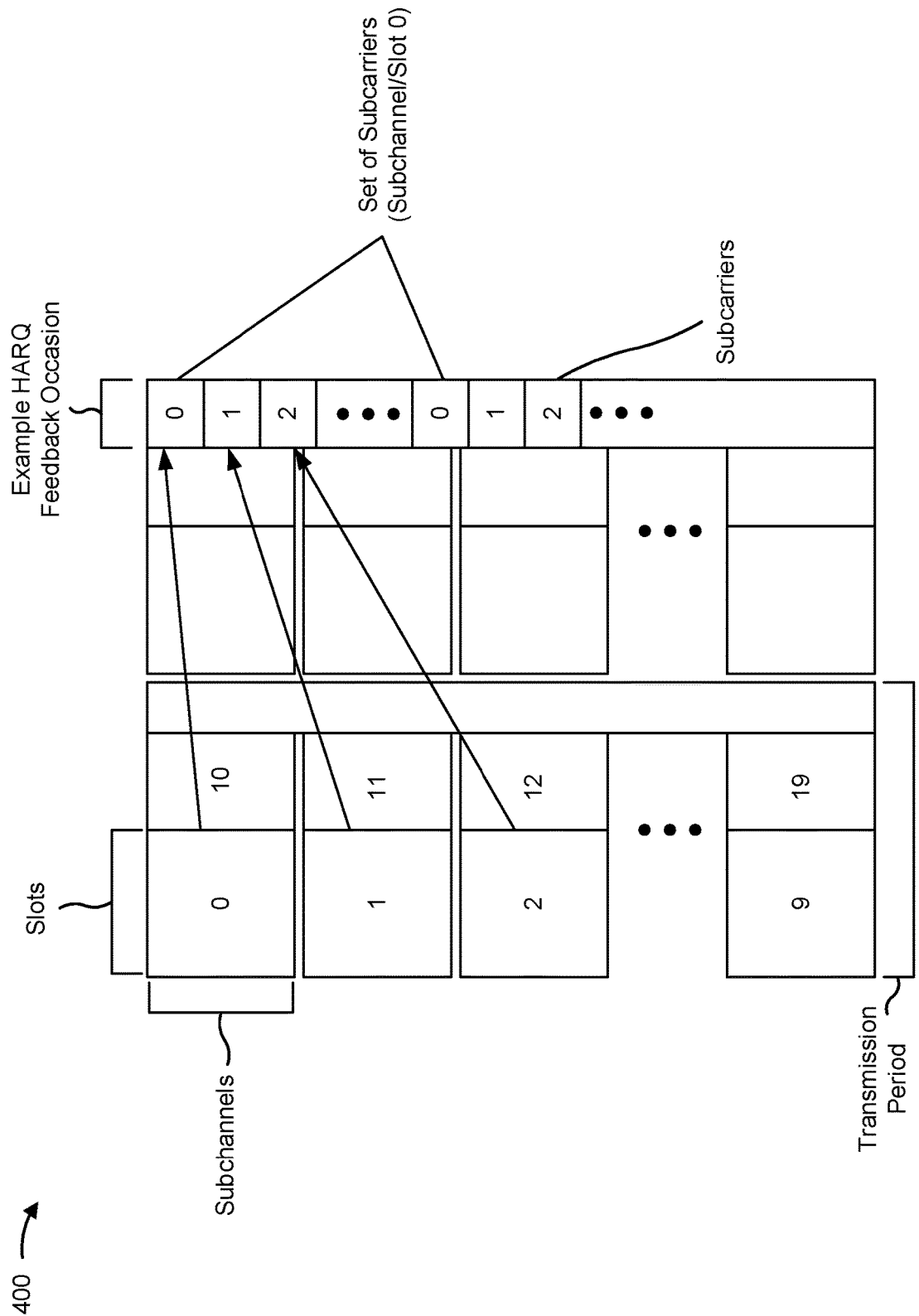
Figure 4C:
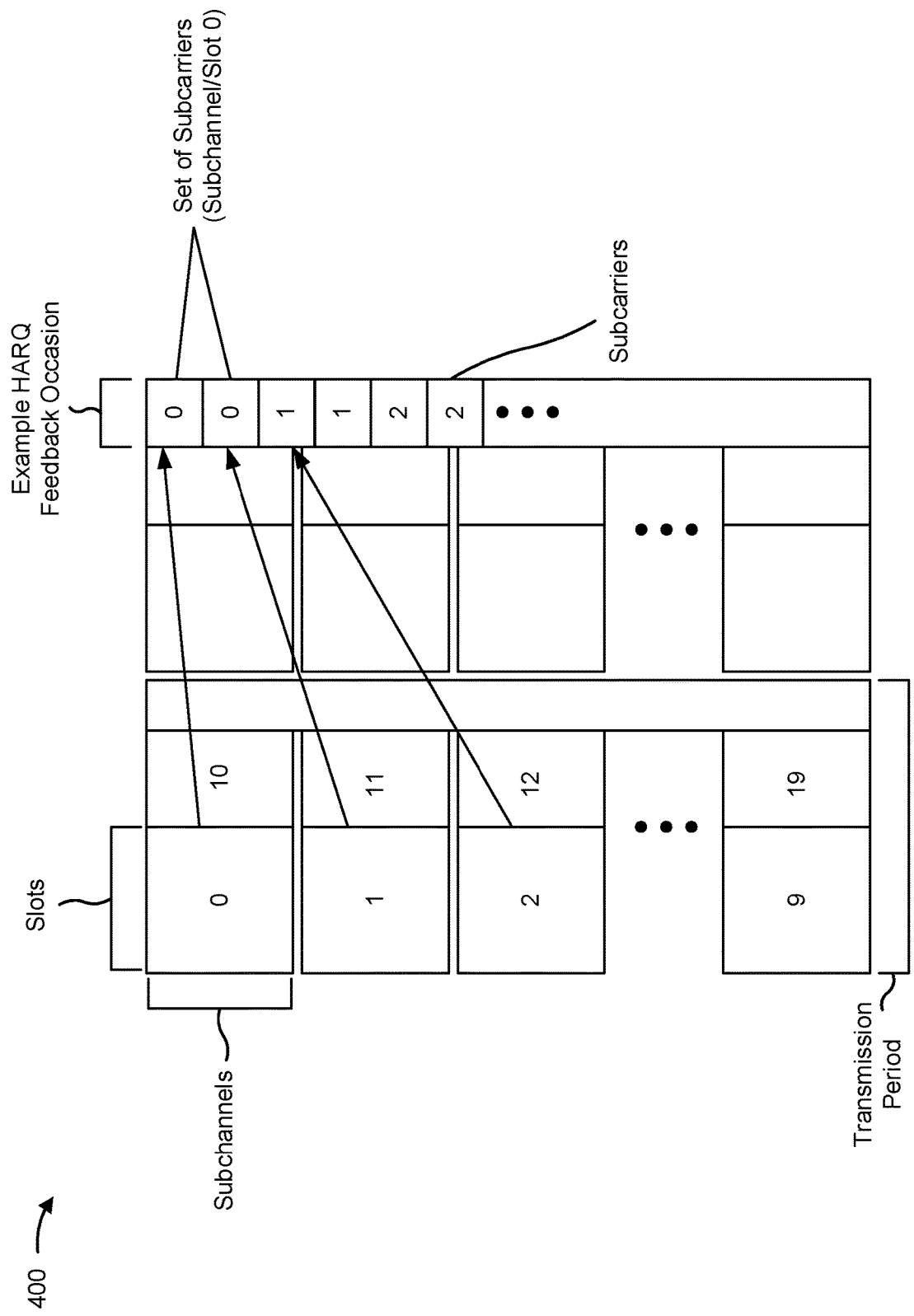

As further shown in FIG. 4A, and by reference number 406, UE1 may identify a HARQ feedback occasion and one or more sets of subcarriers in the HARQ feedback occasion for the HARQ feedback associated with the one or more sidelink communications. FIGS. 4B and 4C illustrate example configurations of HARQ feedback occasions. Other examples of configurations for HARQ feedback occasions may be used.

As shown in the example configuration in FIG. 4B, a HARQ feedback occasion may include a time-domain duration (e.g., one or more symbols) and a plurality of frequency-domain resources (e.g., a plurality of subcarriers) that are reserved for HARQ feedback on the sidelink. In some aspects, the frame structure of the sidelink may include a plurality of HARQ feedback occasions. The plurality of HARQ feedback occasions may be periodic (e.g., may occur at a particular time interval), may be configured at particular time-domain locations, and/or the like. In some aspects, a HARQ feedback occasion may be a multi-slot HARQ feedback occasion in that the HARQ feedback occasion may be used to aggregate HARQ feedback for sidelink communications that were transmitted in a plurality of subchannels and a plurality of slots that occurred prior to the HARQ feedback occasion. In this way, UE1 may use a HARQ feedback occasion to FDM and transmit HARQ feedback for a plurality of slots and a plurality of sub channels.

The plurality of slots corresponding to a HARQ feedback occasion may be referred to as a transmission period for the HARQ feedback occasion. HARQ feedback for sidelink communications that were transmitted during the transmission period may be transmitted in the HARQ feedback occasion associated with the transmission period. In the example illustrated in FIG. 4B, the transmission period for the example HARQ feedback occasion may span 2 slots and 10 subchannels. In this example, the transmission period for the example HARQ feedback occasion may include 20 time-frequency resources (e.g., subchannel/slot 0 through subchannel/slot 19) in which sidelink communications may be transmitted.

In some aspects, UE1 may identify the HARQ feedback occasion in which to transmit HARQ feedback for a sidelink communication based at least in part a time-domain resource location of the sidelink communication (e.g., a slot in which the sidelink communication was received, the last or ending slot of a multi-slot sidelink communication, and/or the like). For example, UE1 may determine that the time-domain resource location of the sidelink communication (e.g., the slot in which the sidelink communication was received, a first or starting slot of a multi-slot sidelink communication, a last or ending slot of a multi-slot sidelink communication, and/or the like) is mapped to a particular HARQ feedback occasion (e.g., is included in a transmission period associated with the HARQ feedback occasion). As another example, UE1 may determine the HARQ feedback occasion based at least in part on a HARQ feedback processing capability of the UE (e.g., an amount of time that UE1 takes to determine and transmit HARQ feedback for a sidelink communication). As a further example, UE1 may determine the HARQ feedback occasion based at least in part on a HARQ feedback delay parameter configured for the wireless network (e.g., a system-wide delay between receiving a sidelink communication and transmitting HARQ feedback for the sidelink communication). Accordingly, UE1 may determine the HARQ feedback occasion to be the next HARQ feedback occasion that occurs in the time-domain relative to when the sidelink communication was received or may determine the HARQ feedback occasion as a HARQ feedback occasion that occurs m slots after the slot in which the sidelink communication was received.

As further shown in FIG. 4B, the plurality of frequency-domain resources in the HARQ feedback occasion may be partitioned into a plurality of sets of subcarriers. As an example, the HARQ feedback occasion may include a first set of subcarriers 0, a second set of subcarriers 1, and so on. The plurality of sets of subcarriers may be frequency division multiplexed in the HARQ feedback occasion. Each set of subcarriers may include a respective plurality of subcarriers. In some aspects, a plurality of subcarriers, included in a set of subcarriers in the HARQ feedback occasion, may be exclusive to the set of subcarriers. In this case, no subcarrier, included in the plurality of subcarriers, is included in another set of subcarriers in the HARQ feedback occasion. Moreover, in the example configuration illustrated in FIG. 4B, the plurality of subcarriers in a set of subcarriers may be non-contiguous subcarriers that are spaced apart to form a frequency comb in the HARQ feedback occasion. The plurality of subcarriers in a set of subcarriers may be unevenly spaced apart (e.g., some subcarriers in the set of subcarriers may be spaced apart by a different number of subcarriers relative to other subcarriers in the set of subcarriers) across the frequency bandwidth for the HARQ feedback occasion, the plurality of subcarriers in a set of subcarriers may be evenly spaced apart across the frequency bandwidth for the HARQ feedback occasion, or a combination thereof.

In some aspects, each set of subcarriers in the HARQ feedback occasion may be associated with a time-frequency resource in the transmission period associated with the HARQ feedback occasion. UE1 may receive a HARQ configuration (e.g., from UE2, from another UE, from a BS in the wireless network, and/or the like) that identifies the mapping between sets of subcarriers and time-frequency resources, may be hard coded with the HARQ configuration (e.g., the HARQ configuration may be stored on UE1 prior to UE1 being deployed in the wireless network), and/or the like. Accordingly, UE1 may identify a set of subcarriers, in the HARQ feedback occasion, for transmitting HARQ feedback for a sidelink communication based at least in part on the time-domain resource (e.g., slot) and the frequency-domain resource (e.g., subchannel) in which the sidelink communication was received.

As an example of the above, subchannel/slot 0 may be associated with set of subcarriers 0, subchannel/slot 1 may be associated with set of subcarriers 1, subchannel/slot 2 may be associated with set of subcarriers 2, subchannel/slot 3 may be associated with set of subcarriers 3, and so on. In some aspects, time-frequency resources in a transmission period may be assigned sets of subcarriers in a column-major (e.g., as illustrated in FIG. 4B), in which all of the time-frequency resources in a slot are mapped to sets of subcarriers before proceeding to the next slot to map time-frequency resources to sets of subcarriers. In some aspects, time-frequency resources in a transmission period may be assigned sets of subcarriers in a row-major in which all of the time-frequency resources in a subchannel in transmission period are mapped to sets of subcarriers before proceeding to the next subchannel to map time-frequency resources to sets of subcarriers.

In some aspects, UE1 may identify the set of subcarriers in which to transmit HARQ feedback for a sidelink communication based at least in part on the time-frequency resource in which the sidelink communication was received. In this case, HARQ feedback for each sidelink communication may be associated with a respective set of subcarriers. For example, UE1 may identify set of subcarriers 0 for HARQ feedback for a sidelink communication that was received in subchannel/slot 0, may identify set of subcarriers 1 for HARQ feedback for a sidelink communication that was received in subchannel/slot 1, may identify set of subcarriers 2 for HARQ feedback for a sidelink communication that was received in subchannel/slot 2, and so on. Accordingly, UE1 may identify respective sets of subcarriers, in the HARQ feedback occasion, in which to transmit HARQ feedback for one or more sidelink communications based at least in part on the time-frequency resources in which the one or more sidelink communications were received.

In some aspects, the transmission of a sidelink communication may span a plurality of slots. In this case, the sidelink communication may be referred to as a multi-slot sidelink communication. UE1 may determine the set of subcarriers for the HARQ feedback for a multi-slot sidelink communication may be determined based at least in part on the first or starting slot for the multi-slot sidelink communication or may be determined based at least in part on a last or ending slot for the multi-slot sidelink communication.

As shown in the example configuration in FIG. 4C, the plurality of subcarriers in a set of subcarriers may be contiguous subcarriers. For example, the plurality of subcarriers included in set of subcarriers 0 may form a group of contiguous and/or consecutive subcarriers, the plurality of subcarriers included in set of subcarriers 1 may form another group of contiguous and/or consecutive subcarriers, and so on. The groups of contiguous subcarriers may be non-overlapping such that any subcarrier in the HARQ feedback occasion is included in only one set of subcarriers.

As shown in FIG. 4D, and by reference number 408, UE1 may identify at least a subset of HARQ feedback for the plurality of HARQ feedback. UE1 may identify a subset of HARQ feedback due to various causes. For example, if UE1 is scheduled to provide the plurality of HARQ feedback in the HARQ feedback occasion, UE1 may determine that UE1 is not capable of transmitting all of the plurality of HARQ feedback in the HARQ feedback occasion (e.g., based at least in part on a HARQ processing capability of UE1). Accordingly, UE1 may identify the subset of HARQ feedback that UE1 may be capable of transmitting in the HARQ feedback occasion.

As another example, if UE1 is scheduled to provide the plurality of HARQ feedback in the HARQ feedback occasion, UE1 may determine that UE1 that is not permitted to transmit all of the plurality of HARQ feedback in the HARQ feedback occasion (e.g., based at least in part on a parameter that specifies a maximum number of HARQ feedback that may be configured by a BS and/or another component in the wireless network). Accordingly, UE1 may identify the subset of HARQ feedback that UE1 may be permitted to transmit in the HARQ feedback occasion.

As another example, UE1 may detect a collision between two or more sidelink communications and/or a HARQ feedback collision associated with the two or more sidelink communications. In this case, UE1 may receive two more sidelink communications, from a plurality of UEs, in the same time-domain resource and frequency domain-resource (e.g., which may be referred to as a collision). Since, the time-domain resource and frequency domain-resource may be mapped to a set of subcarriers in the HARQ feedback occasion, and since UE1 may be permitted to provide HARQ feedback for only one sidelink communication in a set of subcarriers, the two or more sidelink communications may cause a HARQ feedback collision. Accordingly, UE1 may determine whether to drop or discard one or more of the sidelink communications such that HARQ feedback for the remaining sidelink communication is included in the subset of HARQ feedback.

In some aspects, UE1 may identify the subset of HARQ feedback for the plurality of HARQ feedback based at least in part on one or more parameters for identifying the subset of HARQ feedback. In some aspects, the one or more parameters may be included in the HARQ configuration described above, in another configuration that is received at and/or hard coded for UE1, and/or the like. UE1 may determine, based at least in part on the one or more parameters, which HARQ feedback of the plurality of HARQ feedback is to be included in the subset of HARQ feedback for transmission in the HARQ feedback occasion.

In some aspects, the one or more parameters may include a parameter for priority associated with the plurality of sidelink communications, a parameter for distance between UE1 and the UEs that transmitted the plurality of sidelink communications (e.g., UE2 and/or other UEs), a parameter for one or more signal measurements associated with the UEs that transmitted the plurality of sidelink communications, a parameter for frequency-domain location of the plurality of HARQ feedback, a parameter for transmission mode associated with the plurality of sidelink communications, and/or the like.

In some aspects, UE1 may identify the subset of HARQ feedback based at least in part on respective priorities associated with each of the plurality of sidelink communications, using various techniques. In some aspects, the priorities may include a channel priority or another type of priority associated with the plurality of sidelink communications. For example, UE1 may determine that a priority associated with a first sidelink communication is higher relative to a priority associated with a second sidelink communication, and may identify or select the HARQ feedback for the first sidelink communication to be included in the subset of HARQ feedback. As another example, the parameter for priority associated with the plurality of sidelink communications may indicate that UE1 is to start with HARQ feedback for sidelink communications having the highest priority, and is to identify or select HARQ feedback associated with sidelink communications of gradually decreasing priority until the subset of HARQ feedback fills the number of HARQ feedback that UE1 is capable and/or permitted to transmit in the HARQ feedback occasion. As another example, the parameter for priority associated with the plurality of sidelink communications may indicate that UE1 is to identify or select HARQ feedback associated with sidelink communications that have a priority that satisfies a priority threshold.

In some aspects, UE1 may determine the priority for a sidelink communication of the plurality of sidelink communications based at least in part on SCI associated with the sidelink communication. For example, the SCI may be included in a control portion associated with the data portion of the sidelink communication, and the SCI may include a field or value that indicates or specifies the priority of the sidelink communication.

In some aspects, UE1 may identify the subset of HARQ feedback based at least in part on respective distances between UE1 and the UEs that transmitted the plurality of sidelink communications. For example, UE1 may determine that a distance between UE1 and a first UE that transmitted a first sidelink communication is greater relative to a distance between UE1 and a second UE that transmitted a second sidelink communication, and may identify or select the HARQ feedback for the first sidelink communication to be included in the subset of HARQ feedback based at least in part on the distance between UE1 and the first UE being greater than the distance between UE1 and the second UE. As another example, UE1 may determine that a distance between UE1 and a first UE that transmitted a first sidelink communication is shorter relative to a distance between UE1 and a second UE that transmitted a second sidelink communication, and may identify or select the HARQ feedback for the first sidelink communication to be included in the subset of HARQ feedback based at least in part on the distance between UE1 and the first UE being shorter than the distance between UE1 and the second UE.

As another example, the parameter for distance between UE1 and the UEs that transmitted the plurality of sidelink communications may indicate that UE1 is to start with HARQ feedback for sidelink communications associated with UEs being the greatest distance from UE1, and is to identify or select HARQ feedback associated with sidelink communications associated with UEs of gradually decreasing distance from UE1 until the subset of HARQ feedback fills the number of HARQ feedback that UE1 is capable and/or permitted to transmit in the HARQ feedback occasion. As another example, the parameter for distance between UE1 and the UEs that transmitted the plurality of sidelink communications may indicate that UE1 is to start with HARQ feedback for sidelink communications associated with UEs being the shortest distance from UE1, and is to identify or select HARQ feedback associated with sidelink communications associated with UEs of gradually increasing distance from UE1 until the subset of HARQ feedback fills the number of HARQ feedback that UE1 is capable and/or permitted to transmit in the HARQ feedback occasion.

As another example, the parameter for distance between UE1 and the UEs that transmitted the plurality of sidelink communications may indicate that UE1 is to identify or select HARQ feedback associated with sidelink communications associated with UEs that are a distance from UE1 that satisfies a distance threshold or does not satisfy a distance threshold. In some aspects, UE1 may determine the distance between UE1 and the UEs that transmitted the plurality of sidelink communications based at least in part on respective RTTs and/or another type of distance measurement associated with the UEs.

In some aspects, UE1 may identify the subset of HARQ feedback based at least in part on respective signal measurements (e.g., signal strength, RSRP, RSSI, RSRP, CQI, and/or the like) associated with the UEs that transmitted the plurality of sidelink communications. For example, UE1 may determine that a first signal measurement associated with a first UE that transmitted a first sidelink communication is greater relative to a second signal measurement associated with a second UE that transmitted a second sidelink communication, and may identify or select the HARQ feedback for the first sidelink communication to be included in the subset of HARQ feedback based at least in part on the first signal measurement being greater relative to the second signal measurement. As another example, UE1 may determine that a first signal measurement associated with a first UE that transmitted a first sidelink communication is lesser relative to a second signal measurement associated with a second UE that transmitted a second sidelink communication, and may identify or select the HARQ feedback for the first sidelink communication to be included in the subset of HARQ feedback based at least in part on the first signal measurement being lesser relative to the second signal measurement.

As another example, the parameter for one or more signal measurements associated with the UEs that transmitted the plurality of sidelink communications may indicate that UE1 is to start with HARQ feedback for sidelink communications associated with UEs that have the greatest signal measurements, and is to identify or select HARQ feedback associated with sidelink communications associated with UEs of gradually decreasing signal measurements until the subset of HARQ feedback fills the number of HARQ feedback that UE1 is capable and/or permitted to transmit in the HARQ feedback occasion. As another example, the parameter for one or more signal measurements associated with the UEs that transmitted the plurality of sidelink communications may indicate that UE1 is to start with HARQ feedback for sidelink communications associated with UEs having the lowest (e.g., weakest) signal measurements, and is to identify or select HARQ feedback associated with sidelink communications associated with UEs of gradually increasing signal measurements until the subset of HARQ feedback fills the number of HARQ feedback that UE1 is capable and/or permitted to transmit in the HARQ feedback occasion.

As another example, the parameter for one or more signal measurements associated with the UEs that transmitted the plurality of sidelink communications may indicate that UE1 is to identify or select HARQ feedback associated with sidelink communications associated with UEs that have a signal measurement that satisfies a signal measurement threshold or does not satisfy a signal measurement threshold.

In some aspects, UE1 may identify the subset of HARQ feedback based at least in part on respective transmission modes associated with the plurality of sidelink communications using various techniques. For example, the parameter for transmission mode associated with the plurality of sidelink communications may specify or indicate that UE1 is to identify or select HARQ feedback associated with sidelink communications that were transmitted with a particular transmission mode or were transmitted with a transmission mode of one or more particular transmission modes. A transmission mode may include a unicast transmission mode, a groupcast transmission mode, a multicast transmission mode, a broadcast transmission mode, and/or the like. As another example, the parameter for transmission mode associated with the plurality of sidelink communications may specify or indicate a hierarchy of transmission modes (e.g., unicast>groupcast>multicast>broadcast, and/or another hierarchy), and UE1 may identify or select HARQ feedback associated with sidelink communications by traversing down the hierarchy until the subset of HARQ feedback fills the number of HARQ feedback that UE1 is capable and/or permitted to transmit in the HARQ feedback occasion.

In some aspects, UE1 may identify the subset of HARQ feedback based at least in part on frequency-domain locations (e.g., subcarriers, sets of subcarriers, and/or the like) of the plurality of HARQ feedback in the HARQ feedback occasion using various techniques. For example, the parameter for frequency-domain location of the plurality of HARQ feedback may specify or indicate that UE1 is to identify or select HARQ feedback such that the subset of HARQ feedback is grouped together in the HARQ feedback occasion and/or such that the subset of HARQ feedback results in a minimized number of HARQ feedback clusters or groups in the HARQ feedback occasion.

Figure 4E:
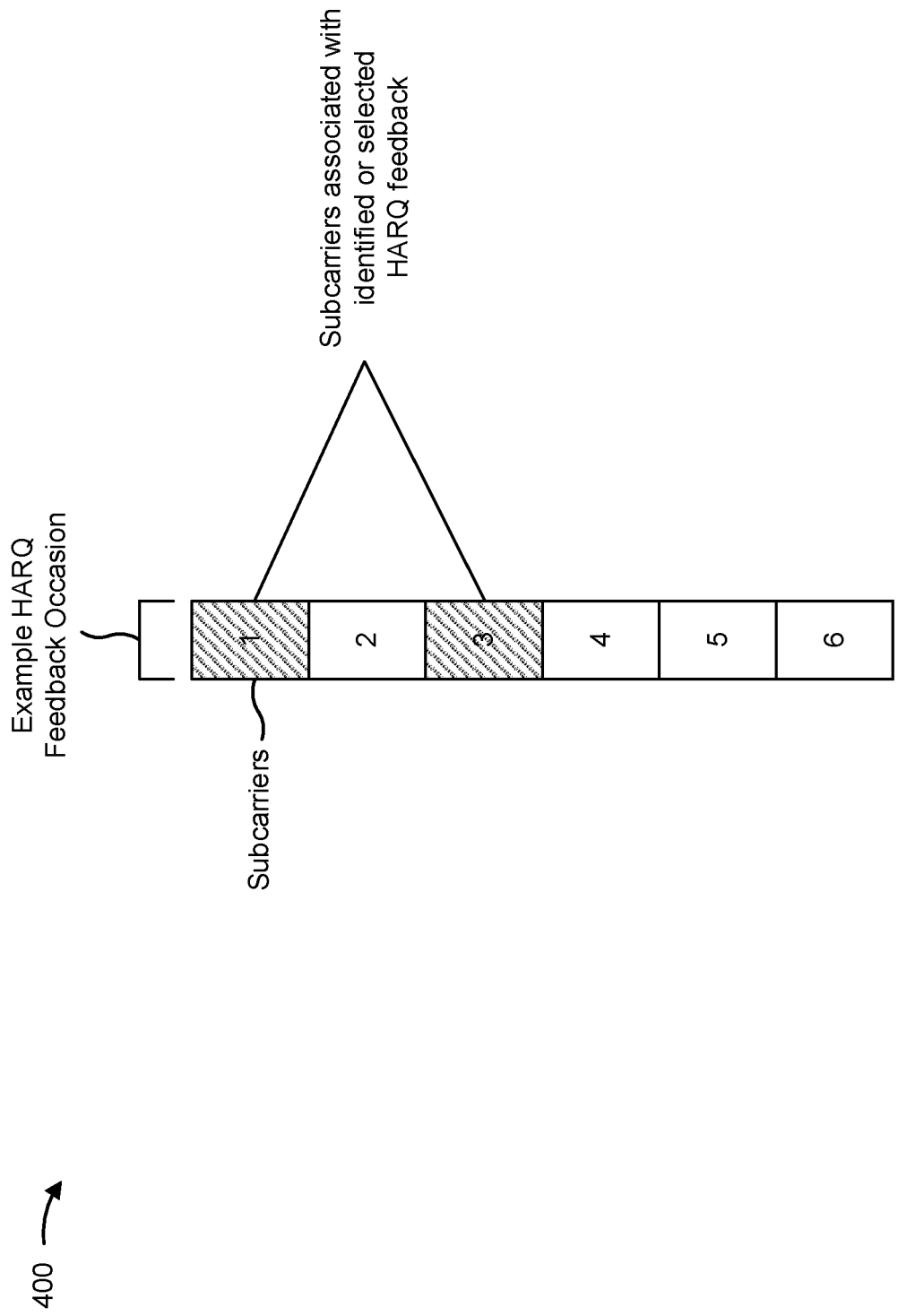

FIG. 4E illustrates an example of the parameter for frequency-domain location of the plurality of HARQ feedback. As shown in FIG. 4E, UE1 has identified or selected the HARQ feedback that is to be transmitted in set of subcarriers 1 and set of subcarriers 3 in the HARQ feedback occasion. As described above, the parameter for frequency-domain location of the plurality of HARQ feedback may indicate that UE1 is to identify or select HARQ feedback such that the subset of HARQ feedback is grouped together in the HARQ feedback occasion and/or such that the subset of HARQ feedback results in a minimized number of HARQ feedback clusters or groups in the HARQ feedback occasion. Accordingly, for the parameter for frequency-domain location of the plurality of HARQ feedback, UE1 may determine that the HARQ feedback that is to be transmitted in set of subcarriers 2 is the highest priority because set of subcarriers 1 through set of subcarriers 3 are contiguous and/or consecutive, and result in a single group or cluster of HARQ feedback in the HARQ feedback occasion. UE1 may determine that the HARQ feedback that is to be transmitted in set of subcarriers 4 is the second highest priority because subcarriers 3 and 4 are contiguous and/or consecutive, and result in two groups or clusters of HARQ feedback in the HARQ feedback occasion (e.g., set of subcarriers 1 being one group or cluster and set of subcarriers 3 and set of subcarriers 4 being another group or cluster). UE1 may determine that the HARQ feedback that is to be transmitted in set of subcarriers 5, and the HARQ feedback that is to be transmitted in set of subcarriers 6, are of equal priority and are the lowest priority because set of subcarriers 5 and set of subcarriers 6 result in three groups or clusters of HARQ feedback in the HARQ feedback occasion.

In some aspects, UE1 may identify the subset of HARQ feedback based at least in part on a single parameter described above, or on a combination of parameters of the one or more parameters described above. In aspects where UE1 identifies the subset of HARQ feedback based at least in part on a combination of parameters of the one or more parameters, the HARQ configuration (and/or another configuration) may indicate a hierarchy for applying the one or more parameters.

For example, the hierarchy may indicate that UE1 is to apply the parameter for priority associated with the plurality of sidelink communications first and the parameter for distance between UE1 and the UEs that transmitted the plurality of sidelink communications second. In this case, if UE1 applies the parameter for priority associated with the plurality of sidelink communications and determines that the subset of HARQ feedback still does not fit within the number of HARQ feedback that UE1 is capable and/or permitted to transmit in the HARQ feedback occasion, UE1 may apply the parameter for distance between UE1 and the UEs that transmitted the plurality of sidelink communications to identify or select HARQ feedback between sidelink communications of the same priority.

As another example, the hierarchy may indicate that UE1 is to apply the parameter for priority associated with the plurality of sidelink communications first and the parameter for one or more signal measurements associated with the UEs that transmitted the plurality of sidelink communications second. In this case, if UE1 applies the parameter for priority associated with the plurality of sidelink communications and determines that the subset of HARQ feedback still does not fit within the number of HARQ feedback that UE1 is capable and/or permitted to transmit in the HARQ feedback occasion, UE1 may apply the parameter for one or more signal measurements associated with the UEs that transmitted the plurality of sidelink communications to identify or select HARQ feedback between sidelink communications of the same priority.

As another example, the hierarchy may indicate that UE1 is to apply the parameter for priority associated with the plurality of sidelink communications first and the parameter for transmission mode associated with the plurality of sidelink communications second. In this case, if UE1 applies the parameter for priority associated with the plurality of sidelink communications and determines that the subset of HARQ feedback still does not fit within the number of HARQ feedback that UE1 is capable and/or permitted to transmit in the HARQ feedback occasion, UE1 may apply the parameter for transmission mode associated with the plurality of sidelink communications to identify or select HARQ feedback between sidelink communications of the same priority.

As another example, the hierarchy may indicate that UE1 is to apply the parameter for priority associated with the plurality of sidelink communications first and the parameter for frequency-domain location of the plurality of HARQ feedback second. In this case, if UE1 applies the parameter for priority associated with the plurality of sidelink communications and determines that the subset of HARQ feedback still does not fit within the number of HARQ feedback that UE1 is capable and/or permitted to transmit in the HARQ feedback occasion, UE1 may apply the parameter for frequency-domain location of the plurality of HARQ feedback to identify or select HARQ feedback between sidelink communications of the same priority.

As another example, the hierarchy may indicate that UE1 is to apply the parameter for transmission mode associated with the plurality of sidelink communications first and the parameter for priority associated with the plurality of sidelink communications second. In this case, if UE1 applies the parameter for transmission mode associated with the plurality of sidelink communications and determines that the subset of HARQ feedback still does not fit within the number of HARQ feedback that UE1 is capable and/or permitted to transmit in the HARQ feedback occasion, UE1 may apply the parameter for priority associated with the plurality of sidelink communications to identify or select HARQ feedback between sidelink communications of the same transmission mode. Similar hierarchies, where the parameter for transmission mode associated with the plurality of sidelink communications is applied first, and one or more of the parameter for priority associated with the plurality of sidelink communications, the parameter for one or more signal measurements associated with the UEs that transmitted the plurality of sidelink communications, or the parameter for distance between UE1 and the UEs that transmitted the plurality of sidelink communications are applied after the parameter for transmission mode associated with the plurality of sidelink communications is applied.

The hierarchies described above for applying the one or more parameters are examples, and other examples of hierarchies for applying the one or more parameters (and/or other parameters) may be used to identify or select the subset of HARQ feedback from the plurality of HARQ feedback.

Figure 4F:
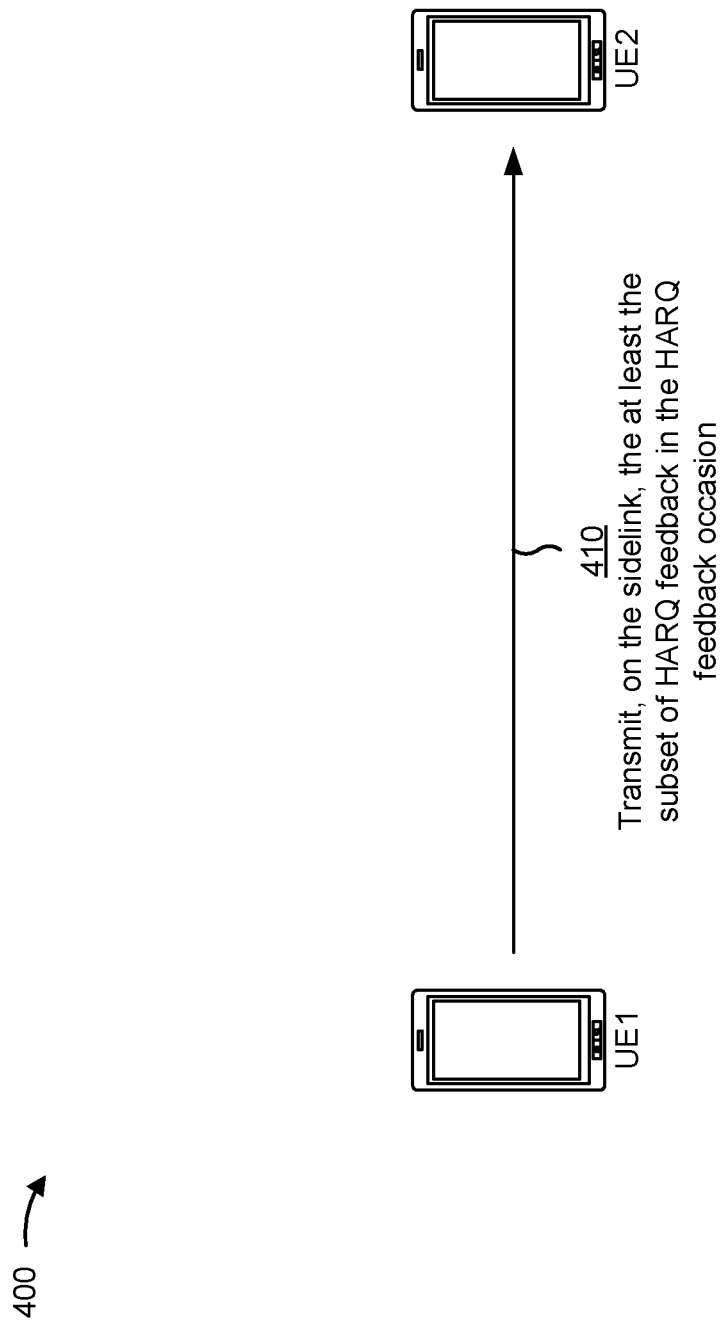

As shown in FIG. 4F, and by reference number 410, UE1 may transmit, on the sidelink, the at least the subset of HARQ feedback using the one or more sets of subcarriers of the HARQ feedback occasion that are associated with the sidelink communications corresponding to the subset of HARQ feedback. For example, UE1 may transmit HARQ feedback for a first sidelink communication in a first set of subcarriers identified for the first sidelink communication, may transmit HARQ feedback for a second sidelink communication in a second set of subcarriers identified for the second sidelink communication, and so on. The UE may transmit the subset of HARQ feedback in one or more HARQ feedback communications to UE2 and/or to other UEs that transmitted the sidelink communications corresponding to the subset of HARQ feedback. In some aspects, UE1 may transmit the HARQ feedback communications on a feedback channel, such as a physical sidelink feedback channel (PSFCH) and/or another type of channel. In some aspects, the transmission of HARQ feedback for a sidelink communication may be considered a separate feedback channel from HARQ feedback for other sidelink communications. In some aspects, the collective transmissions of HARQ feedback for the one or more sidelink communications may be considered a feedback channel.

In this way, UE1 may receive a plurality of sidelink communications on a sidelink and from one or more other UEs (e.g., UE2 and/or other UEs). If UE1 determines that UE1 is not capable and/or permitted to transmit HARQ feedback for all of the sidelink communications in a HARQ feedback occasion, UE1 may identify a subset of HARQ feedback to transmit in the HARQ feedback occasion using the techniques described herein. In this way, UE1 is capable of multiplexing HARQ feedback in a HARQ feedback occasion, is capable of identifying subsets of HARQ feedback to multiplex in a HARQ feedback occasion, and/or the like.

As indicated above, FIGS. 4A-4F are provided as one or more examples. Other examples may differ from what is described with respect to FIGS. 4A-4F.

FIG. 5 is a diagram illustrating an example process 500 performed, for example, by a UE, in accordance with various aspects of the present disclosure. Example process 500 is an example where a UE (e.g., UE 120) performs operations associated with techniques for transmitting sidelink HARQ feedback.

As shown in FIG. 5, in some aspects, process 500 may include determining a plurality of HARQ feedback for a plurality of sidelink communications (block 510). For example, the UE (e.g., using receive processor 258, transmit processor 264, controller/processor 280, memory 282, and/or the like) may determine a plurality of HARQ feedback for a plurality of sidelink communications, as described above.

As further shown in FIG. 5, in some aspects, process 500 may include identifying at least a subset of HARQ feedback from the plurality of HARQ feedback based at least in part on one or more parameters (block 520). For example, the UE (e.g., using receive processor 258, transmit processor 264, controller/processor 280, memory 282, and/or the like) may identify at least a subset of HARQ feedback from the plurality of HARQ feedback based at least in part on one or more parameters, as described above.

As further shown in FIG. 5, in some aspects, process 500 may include transmitting, on a sidelink, the at least the subset of HARQ feedback in a HARQ feedback occasion (block 530). For example, the UE (e.g., using receive processor 258, transmit processor 264, controller/processor 280, memory 282, and/or the like) may transmit, on a sidelink, the at least the subset of HARQ feedback in a HARQ feedback occasion, as described above.

Process 500 may include additional aspects, such as any single aspect or any combination of aspects described below and/or in connection with one or more other processes described elsewhere herein.

In a first aspect, identifying the at least the subset of HARQ feedback from the plurality of HARQ feedback comprises identifying the at least the subset of HARQ feedback from the plurality of HARQ feedback based at least in part on at least one of determining that the UE is not capable of transmitting all of the plurality of HARQ feedback in the HARQ feedback occasion, determining that the UE is not permitted to transmit all of the plurality of HARQ feedback in the HARQ feedback occasion, detecting a collision between two or more sidelink communications of the plurality of sidelink communications, or detecting a HARQ feedback collision in the HARQ feedback occasion. In a second aspect, alone or in combination with the first aspect, each HARQ feedback of the plurality of HARQ feedback comprises a NACK associated with a respective sidelink communication of the plurality of sidelink communications.

In a third aspect, alone or in combination with one or more of the first and second aspects, a HARQ feedback of the plurality of HARQ feedback comprises a NACK or an ACK associated with a respective sidelink communication of the plurality of sidelink communications. In a fourth aspect, alone or in combination with one or more of the first through third aspects, process 500 further comprises identifying the HARQ feedback occasion from a plurality of periodic HARQ feedback occasions based at least in part on a time-domain resource location of the plurality of sidelink communications and a HARQ feedback delay parameter. In a fifth aspect, alone or in combination with one or more of the first through fourth aspects, process 500 further comprises identifying, for the plurality of HARQ feedback, respective sets of subcarriers in the HARQ feedback occasion based at least in part on respective subchannels, of the sidelink, associated with the plurality of sidelink communications.

In a sixth aspect, alone or in combination with one or more of the first through fifth aspects, the one or more parameters comprise at least one of a priority associated with the plurality of sidelink communications, a distance between the UE and one or more other UEs, one or more signal measurements associated with the one or more UEs, a frequency-domain location of the plurality of HARQ feedback, or a transmission mode associated with the plurality of sidelink communications. In a seventh aspect, alone or in combination with one or more of the first through sixth aspects, the one or more parameters comprise a priority associated with the plurality of sidelink communications, a priority associated with a first sidelink communication of the plurality of sidelink communications is higher relative to a priority associated with a second sidelink communication of the plurality of sidelink communications, and identifying the at least the subset of HARQ feedback from the plurality of HARQ feedback comprises identifying the first HARQ feedback based at least in part on determining that the priority associated with the first sidelink communication is higher relative to the priority associated with the second sidelink communication.

In an eighth aspect, alone or in combination with one or more of the first through seventh aspects, the priority associated with the first sidelink communication is indicated in SCI associated with the first sidelink communication. In a ninth aspect, alone or in combination with one or more of the first through eighth aspects, the one or more parameters comprise a priority associated with the plurality of sidelink communications, and a distance between the UE and one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a distance between the UE and a first other UE of one or more other UEs is shorter relative to a distance between the UE and a second other UE of one or more other UEs and identifying the first HARQ feedback or the second HARQ feedback based at least in part on determining whether the distance between the UE and the first other UE is shorter relative to the distance between the UE and the second other UE.

In a tenth aspect, alone or in combination with one or more of the first through ninth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In an eleventh aspect, alone or in combination with one or more of the first through tenth aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twelfth aspect, alone or in combination with one or more of the first through eleventh aspects, the one or more parameters comprise a priority associated with the plurality of sidelink communications, and one or more measurements associated with one or more other UEs, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether a signal strength measurement associated with a first other UE of one or more other UEs is greater relative to a signal strength measurement associated with a second other UE of one or more other UEs and identifying the first HARQ feedback or the second HARQ feedback based at least in part on determining whether the signal strength measurement associated with the first other UE is greater relative to the signal strength measurement associated with the second other UE.

In a thirteenth aspect, alone or in combination with one or more of the first through twelfth aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a fourteenth aspect, alone or in combination with one or more of the first through thirteenth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a fifteenth aspect, alone or in combination with one or more of the first through fourteenth aspects, the one or more parameters comprise a priority associated with the plurality of sidelink communications, and a transmission mode associated with the plurality of sidelink communications, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises identifying, based at least in part on determining that the priority associated with the first sidelink communication and the priority associated with the second sidelink communication are the same priority, the first HARQ feedback or the second HARQ feedback based at least in part on a transmission mode associated with the first sidelink communication and a transmission mode associated with the second sidelink communication. In a sixteenth aspect, alone or in combination with one or more of the first through fifteenth aspects, the transmission mode associated with the first sidelink communication and the transmission mode associated with the second sidelink communication comprise at least one of a unicast transmission mode, a groupcast transmission mode, a multicast transmission mode, or a broadcast transmission mode.

In a seventeenth aspect, alone or in combination with one or more of the first through sixteenth aspects, the one or more parameters comprise a priority associated with the plurality of sidelink communications, and a frequency-domain location of the plurality of HARQ feedback, where a priority, associated with a first sidelink communication of the plurality of sidelink communications, and a priority, associated with a second sidelink communication of the plurality of sidelink communications, are a same priority, and identifying the at least the subset of HARQ feedback from the plurality of HARQ feedback comprises determining, based at least in part on determining that the priority associated with the first sidelink communication and the priority associated with the second sidelink communication are the same priority, whether the first HARQ feedback or the second HARQ feedback minimizes a number of HARQ feedback clusters in the HARQ feedback occasion and identifying the first HARQ feedback or the second HARQ feedback based at least in part on determining whether the first HARQ feedback or the second HARQ feedback minimizes the number of HARQ feedback clusters in the HARQ feedback occasion.

In an eighteenth aspect, alone or in combination with one or more of the first through seventeenth aspects, the one or more parameters comprise a transmission mode associated with the plurality of sidelink communications, and identifying the at least the subset of HARQ feedback from the plurality of HARQ feedback comprises identifying a first HARQ feedback from the plurality of HARQ feedback or a second HARQ feedback from the plurality of HARQ feedback based at least in part on a transmission mode associated with a first sidelink communication, of the plurality of sidelink communications, associated with the first HARQ feedback and a transmission mode associated with a second sidelink communication, of the plurality of sidelink communications, associated with the second HARQ feedback.

In a nineteenth aspect, alone or in combination with one or more of the first through eighteenth aspects, the one or more parameters comprise a transmission mode associated with the plurality of sidelink communications, and a priority associated with the plurality of sidelink communications, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises identifying, based at least in part on determining that the transmission mode associated with the first sidelink communication and the transmission mode associated with the second sidelink communication are the same transmission mode, the first HARQ feedback or the second HARQ feedback based at least in part on a priority associated with the first sidelink communication and a priority associated with the second sidelink communication.

In a twentieth aspect, alone or in combination with one or more of the first through nineteenth aspects, the one or more parameters comprise a transmission mode associated with the plurality of sidelink communications, and a distance between the UE and one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a distance between the UE and a first other UE of one or more other UEs is shorter relative to a distance between the UE and a second other UE of one or more other UEs and identifying the first HARQ feedback or the second HARQ feedback based at least in part on determining whether the distance between the UE and the first other UE is shorter relative to the distance between the UE and the second other UE.

In a twenty-first aspect, alone or in combination with one or more of the first through twentieth aspects, determining whether the distance between the UE and the first other UE is shorter relative to the distance between the UE and the second other UE comprises determining that the distance between the UE and the first other UE is shorter relative to the distance between the UE and the second other UE, and identifying the first HARQ feedback or the second HARQ feedback comprises identifying the first HARQ feedback based at least in part on determining that the distance between the UE and the first other UE is shorter relative to the distance between the UE and the second other UE. In a twenty-second aspect, alone or in combination with one or more of the first through twenty-first aspects, determining whether the distance between the UE and the first other UE is shorter relative to the distance between the UE and the second other UE comprises determining that the distance between the UE and the first other UE is not shorter relative to the distance between the UE and the second other UE, and identifying the first HARQ feedback or the second HARQ feedback comprises identifying the second HARQ feedback based at least in part on determining that the distance between the UE and the first other UE is not shorter relative to the distance between the UE and the second other UE.

In a twenty-third aspect, alone or in combination with one or more of the first through twenty-second aspects, the one or more parameters comprise a transmission mode associated with the plurality of sidelink communications, and one or more measurements associated with one or more other UEs, a transmission mode, associated with a first sidelink communication of the plurality of sidelink communications, and a transmission mode, associated with a second sidelink communication of the plurality of sidelink communications, are a same transmission mode, and identifying the at least the subset of HARQ feedback from the plurality of HARQ feedback comprises determining, based at least in part on determining that the transmission mode associated with the first sidelink communication and the transmission mode associated with the second sidelink communication are the same transmission mode, whether a signal strength measurement associated with a first other UE of one or more other UEs is greater relative to a signal strength measurement associated with a second other UE of one or more other UEs and identifying the first HARQ feedback or the second HARQ feedback based at least in part on determining whether the signal strength measurement associated with the first other UE is greater relative to the signal strength measurement associated with the second other UE.

In a twenty-fourth aspect, alone or in combination with one or more of the first through twenty-third aspects, determining whether the signal strength measurement associated with the first other UE is greater relative to the signal strength measurement associated with the second other UE comprises determining that the signal strength measurement associated with the first other UE is greater relative to the signal strength measurement associated with the second other UE, and identifying the first HARQ feedback or the second HARQ feedback comprises identifying the first HARQ feedback based at least in part on determining that the signal strength measurement associated with the first other UE is greater relative to the signal strength measurement associated with the second other UE. In a twenty-fifth aspect, alone or in combination with one or more of the first through twenty-fourth aspects, determining whether the signal strength measurement associated with the first other UE is greater relative to the signal strength measurement associated with the second other UE comprises determining that the signal strength measurement associated with the first other UE is not greater relative to the signal strength measurement associated with the second other UE, and identifying the first HARQ feedback or the second HARQ feedback comprises identifying the second HARQ feedback based at least in part on determining that the signal strength measurement associated with the first other UE is not greater relative to the signal strength measurement associated with the second other UE.

In a twenty-sixth aspect, alone or in combination with one or more of the first through twenty-fifth aspects, the one or more parameters include a priority associated with the plurality of sidelink communications, and a respective priority, associated with each of the plurality of sidelink communications, is indicated in a respective SCI associated with each of the plurality of sidelink communications. In a twenty-seventh aspect, alone or in combination with one or more of the first through twenty-sixth aspects, the one or more parameters include respective priorities associated with each of the plurality of sidelink communications, and identifying the at least the subset of HARQ feedback comprises identifying, for the at least the subset of HARQ feedback, HARQ feedback associated with a first sidelink communication, of the plurality of sidelink communications, having a highest priority, and identifying for the at least the subset of HARQ feedback, HARQ feedback associated with one or more second sidelink communications, of the plurality of sidelink communications, in an order of decreasing priority until the at least the subset of HARQ feedback fills a number of HARQ feedback that the UE is capable of transmitting in the HARQ feedback occasion.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
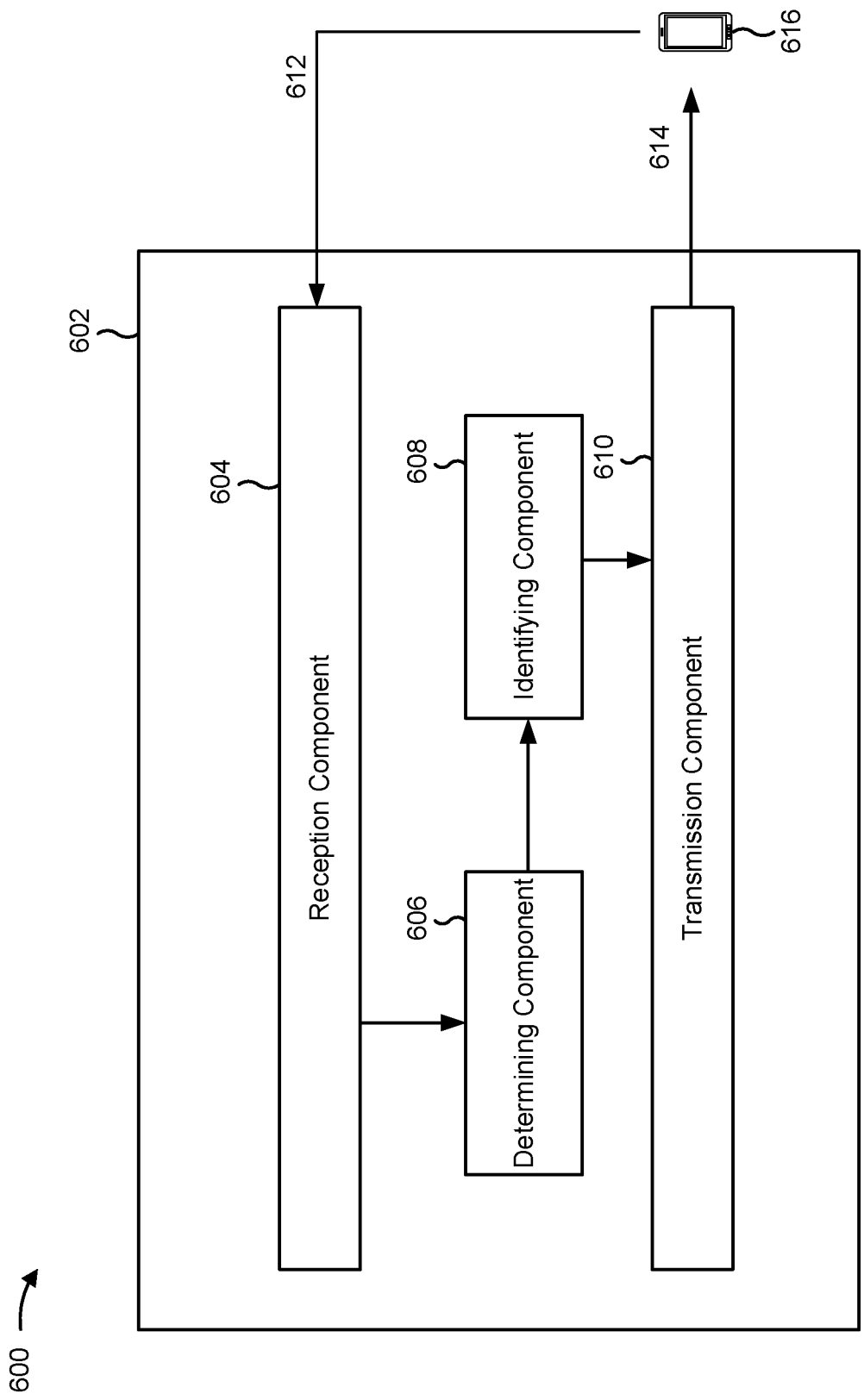
FIG. 6 is a conceptual data flow diagram illustrating data flows between different modules/means/components in an example apparatus, in accordance with various aspects of the present disclosure.

FIG. 6 is a conceptual data flow diagram 600 illustrating data flow between different modules/means/components in an example apparatus 602. The apparatus 602 may be a UE (e.g., UE 120). In some aspects, the apparatus 602 includes a reception component 604, a determining component 606, an identifying component 608, and a transmission component 610.

Reception component 604 may receive a plurality of sidelink communications 612 from one or more UEs 616 (e.g., UE 120). For example, reception component 604 may receive sidelink communications 612 on a sidelink. In some aspects, reception component 604 may include an antenna (e.g., antenna 252), a receive processor (e.g., receive processor 258), a controller/processor (e.g., controller/processor 280), a transceiver, a receiver, and/or the like.

Determining component 606 may determine HARQ feedback for sidelink communications 612. For example, determining component 606 may determine whether to transmit an ACK or a NACK for each of sidelink communications 612. In some aspects, determining component 606 may include a processor (e.g., controller/processor 280, receive processor 258, and/or the like).

Identifying component 608 may identify at least a subset of HARQ feedback from the plurality of HARQ feedback based at least in part on one or more parameters. For example, identifying component 608 may identify the at least the subset of HARQ feedback based at least in part on determining (and/or another component of apparatus 602 determining) that apparatus 602 is not capable of transmitting all of the plurality of HARQ feedback in a HARQ feedback occasion, determining that apparatus 602 is not permitted to transmit all of the plurality of HARQ feedback in the HARQ feedback occasion, detecting a collision between two or more sidelink communications 612, detecting a HARQ feedback collision in the HARQ feedback occasion, and/or the like. In some aspects, the one or more parameters may include, for example, a priority associated with each of sidelink communications 612, a distance between apparatus 602 and UEs 616, one or more signal measurements associated with UEs 616, a frequency-domain location of the plurality of HARQ feedback, a transmission mode associated with sidelink communications 612, and/or the like. In some aspects, identifying component 608 may include a processor (e.g., controller/processor 280, receive processor 258, and/or the like).

Transmission component 610 may transmit, to at least one of UEs 616 and on a sidelink, the at least the subset of HARQ feedback in the HARQ feedback occasion. For example, transmission component 610 may transmit the at least the subset of HARQ feedback in one or more HARQ feedback communications 614. In some aspects, transmission component 610 may include an antenna (e.g., antenna 252), a transmit processor (e.g., transmit processor 264), a controller/processor (e.g., controller/processor 280), a transceiver, a transmitter, and/or the like.

Apparatus 602 may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

Further disclosure is included in the appendix. The appendix is provided as an example only, and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a plurality of hybrid automatic repeat request (HARQ) feedback for a plurality of sidelink communications;
    identifying, for at least a subset of HARQ feedback from the plurality of HARQ feedback and based at least in part on one or more parameters, HARQ feedback associated with one or more sidelink communications, of the plurality of sidelink communications, until the at least the subset of HARQ feedback fills a number of HARQ feedback that the UE is capable of transmitting in a HARQ feedback occasion, wherein the number of HARQ feedback is more than one HARQ feedback; and
    transmitting, on a sidelink, the at least the subset of HARQ feedback in the HARQ feedback occasion.

2. The method of claim 1, wherein the one or more parameters comprise at least one of:
    a priority associated with the plurality of sidelink communications,
    a distance between the UE and one or more other UEs,
    one or more signal measurements associated with the one or more UEs,
    a frequency-domain location of the plurality of HARQ feedback, or
    a transmission mode associated with the plurality of sidelink communications.

3. The method of claim 1, wherein the one or more parameters comprise:
    a priority associated with the plurality of sidelink communications;
    wherein a priority associated with a first sidelink communication of the plurality of sidelink communications is higher relative to a priority associated with a second sidelink communication of the plurality of sidelink communications,
        wherein the first sidelink communication is associated with a first HARQ feedback of the plurality of HARQ feedback, and
        wherein the second sidelink communication is associated with a second HARQ feedback of the plurality of HARQ feedback; and
    wherein identifying the at least the subset of HARQ feedback from the plurality of HARQ feedback comprises:
        identifying the first HARQ feedback based at least in part on determining that the priority associated with the first sidelink communication is higher relative to the priority associated with the second sidelink communication.

4. The method of claim 1, wherein the one or more parameters include a priority associated with the plurality of sidelink communications; and
   wherein a respective priority, associated with each of the plurality of sidelink communications, is indicated in a respective sidelink control information (SCI) associated with each of the plurality of sidelink communications.

5. The method of claim 1, wherein the one or more parameters include respective priorities associated with each of the plurality of sidelink communications; and
   wherein identifying the at least the subset of HARQ feedback comprises:
      identifying, for the at least the subset of HARQ feedback, HARQ feedback associated with a first sidelink communication, of the plurality of sidelink communications, having a highest priority; and
      identifying for the at least the subset of HARQ feedback, HARQ feedback associated with one or more second sidelink communications, of the plurality of sidelink communications, in an order of decreasing priority until the at least the subset of HARQ feedback fills the number of HARQ feedback that the UE is capable of transmitting in the HARQ feedback occasion.

6. The method of claim 1, wherein identifying the HARQ feedback associated with the one or more sidelink communications comprises:
   identifying the HARQ feedback associated with the one or more sidelink communications further based at least in part on at least one of:
      determining that the UE is not capable of transmitting all of the plurality of HARQ feedback in the HARQ feedback occasion,
      determining that the UE is not permitted to transmit all of the plurality of HARQ feedback in the HARQ feedback occasion,
      detecting a collision between two or more sidelink communications of the plurality of sidelink communications, or
      detecting a HARQ feedback collision in the HARQ feedback occasion.

7. The method of claim 1 wherein a HARQ feedback of the plurality of HARQ feedback comprises:
   a negative acknowledgement (NACK) or an acknowledgement (ACK) associated with a respective sidelink communication of the plurality of sidelink communications.

8. The method of claim 1, further comprising:
   identifying the HARQ feedback occasion from a plurality of periodic HARQ feedback occasions based at least in part on:
      a time-domain resource location of the plurality of sidelink communications, and
      a HARQ feedback delay parameter.

9. The method of claim 8, further comprising:
   identifying, for the plurality of HARQ feedback, respective sets of subcarriers in the HARQ feedback occasion based at least in part on respective subchannels, of the sidelink, associated with the plurality of sidelink communications.

10. The method of claim 1, wherein the one or more parameters comprise:
    a priority associated with the plurality of sidelink communications, and
    a distance between the UE and one or more other UEs;
    wherein a priority, associated with a first sidelink communication of the plurality of sidelink communications, and a priority, associated with a second sidelink communication of the plurality of sidelink communications, are a same priority,
       wherein the first sidelink communication is associated with a first HARQ feedback of the plurality of HARQ feedback, and
       wherein the second sidelink communication is associated with a second HARQ feedback of the plurality of HARQ feedback; and
    wherein identifying the HARQ feedback associated with the one or more sidelink communications comprises:
       determining, based at least in part on determining that the priority associated with the first sidelink communication and the priority associated with the second sidelink communication are the same priority, whether a distance between the UE and a first other UE of the one or more other UEs is shorter relative to a distance between the UE and a second other UE of the one or more other UEs; and
       identifying the first HARQ feedback or the second HARQ feedback based at least in part on determining whether the distance between the UE and the first other UE is shorter relative to the distance between the UE and the second other UE.

11. The method of claim 10, wherein determining whether the distance between the UE and the first other UE is shorter relative to the distance between the UE and the second other UE comprises:
    determining that the distance between the UE and the first other UE is shorter relative to the distance between the UE and the second other UE; and
    wherein identifying the first HARQ feedback or the second HARQ feedback comprises:
       identifying the first HARQ feedback based at least in part on determining that the distance between the UE and the first other UE is shorter relative to the distance between the UE and the second other UE.

12. The method of claim 10, wherein determining whether the distance between the UE and the first other UE is shorter relative to the distance between the UE and the second other UE comprises:
    determining that the distance between the UE and the first other UE is not shorter relative to the distance between the UE and the second other UE; and
    wherein identifying the first HARQ feedback or the second HARQ feedback comprises:
       identifying the second HARQ feedback based at least in part on determining that the distance between the UE and the first other UE is not shorter relative to the distance between the UE and the second other UE.

13. The method of claim 1, wherein the one or more parameters comprise:
    a priority associated with the plurality of sidelink communications, and
    one or more measurements associated with one or more other UEs;
    wherein a priority, associated with a first sidelink communication of the plurality of sidelink communications, and a priority, associated with a second sidelink communication of the plurality of sidelink communications, are a same priority,
       wherein the first sidelink communication is associated with a first HARQ feedback of the plurality of HARQ feedback, and wherein the second sidelink communication is associated with a second HARQ feedback of the plurality of HARQ feedback; and
wherein identifying the HARQ feedback associated with the one or more sidelink communications comprises:
determining, based at least in part on determining that the priority associated with the first sidelink communication and the priority associated with the second sidelink communication are the same priority, whether a signal strength measurement associated with a first other UE of the one or more other UEs is greater relative to a signal strength measurement associated with a second other UE of the one or more other UEs; and
identifying the first HARQ feedback or the second HARQ feedback based at least in part on determining whether the signal strength measurement associated with the first other UE is greater relative to the signal strength measurement associated with the second other UE.

14. The method of claim 13, wherein determining whether the signal strength measurement associated with the first other UE is greater relative to the signal strength measurement associated with the second other UE comprises:
determining that the signal strength measurement associated with the first other UE is greater relative to the signal strength measurement associated with the second other UE; and
wherein identifying the first HARQ feedback or the second HARQ feedback comprises:
identifying the first HARQ feedback based at least in part on determining that the signal strength measurement associated with the first other UE is greater relative to the signal strength measurement associated with the second other UE.

15. The method of claim 13, wherein determining whether the signal strength measurement associated with the first other UE is greater relative to the signal strength measurement associated with the second other UE comprises:
determining that the signal strength measurement associated with the first other UE is not greater relative to the signal strength measurement associated with the second other UE; and
wherein identifying the first HARQ feedback or the second HARQ feedback comprises:
identifying the second HARQ feedback based at least in part on determining that the signal strength measurement associated with the first other UE is not greater relative to the signal strength measurement associated with the second other UE.

16. The method of claim 1, wherein the one or more parameters comprise:
a priority associated with the plurality of sidelink communications, and
a transmission mode associated with the plurality of sidelink communications;
wherein a priority, associated with a first sidelink communication of the plurality of sidelink communications, and a priority, associated with a second sidelink communication of the plurality of sidelink communications, are a same priority,
wherein the first sidelink communication is associated with a first HARQ feedback of the plurality of HARQ feedback, and
wherein the second sidelink communication is associated with a second HARQ feedback of the plurality of HARQ feedback; and
wherein identifying the HARQ feedback associated with the one or more sidelink communications comprises:
identifying, based at least in part on determining that the priority associated with the first sidelink communication and the priority associated with the second sidelink communication are the same priority, the first HARQ feedback or the second HARQ feedback based at least in part on a transmission mode associated with the first sidelink communication and a transmission mode associated with the second sidelink communication.

17. The method of claim 1, wherein the one or more parameters comprise:
a priority associated with the plurality of sidelink communications, and
a frequency-domain location of the plurality of HARQ feedback;
wherein a priority, associated with a first sidelink communication of the plurality of sidelink communications, and a priority, associated with a second sidelink communication of the plurality of sidelink communications, are a same priority,
wherein the first sidelink communication is associated with a first HARQ feedback of the plurality of HARQ feedback, and
wherein the second sidelink communication is associated with a second HARQ feedback of the plurality of HARQ feedback; and
wherein identifying the HARQ feedback associated with the one or more sidelink communications comprises:
determining, based at least in part on determining that the priority associated with the first sidelink communication and the priority associated with the second sidelink communication are the same priority, whether the first HARQ feedback or the second HARQ feedback minimizes a number of HARQ feedback clusters in the HARQ feedback occasion; and
identifying the first HARQ feedback or the second HARQ feedback based at least in part on determining whether the first HARQ feedback or the second HARQ feedback minimizes the number of HARQ feedback clusters in the HARQ feedback occasion.

18. The method of claim 1, wherein the one or more parameters comprise:
a transmission mode associated with the plurality of sidelink communications; and
wherein identifying the HARQ feedback associated with the one or more sidelink communications comprises:
identifying a first HARQ feedback from the plurality of HARQ feedback or a second HARQ feedback from the plurality of HARQ feedback based at least in part on:
a transmission mode associated with a first sidelink communication, of the plurality of sidelink communications, associated with the first HARQ feedback, and
a transmission mode associated with a second sidelink communication, of the plurality of sidelink communications, associated with the second HARQ feedback.

19. The method of claim 1, wherein the one or more parameters comprise:
a transmission mode associated with the plurality of sidelink communications, and
a priority associated with the plurality of sidelink communications;

wherein a transmission mode, associated with a first sidelink communication of the plurality of sidelink communications, and a transmission mode, associated with a second sidelink communication of the plurality of sidelink communications, are a same transmission mode, wherein the first sidelink communication is associated with a first HARQ feedback of the plurality of HARQ feedback, and wherein the second sidelink communication is associated with a second HARQ feedback of the plurality of HARQ feedback; and wherein identifying the HARQ feedback associated with the one or more sidelink communications comprises:

identifying, based at least in part on determining that the transmission mode associated with the first sidelink communication and the transmission mode associated with the second sidelink communication are the same transmission mode, the first HARQ feedback or the second HARQ feedback based at least in part on a priority associated with the first sidelink communication and a priority associated with the second sidelink communication.

20. The method of claim 1, wherein the one or more parameters comprise:

a transmission mode associated with the plurality of sidelink communications, and a distance between the UE and one or more other UEs;

wherein a transmission mode, associated with a first sidelink communication of the plurality of sidelink communications, and a transmission mode, associated with a second sidelink communication of the plurality of sidelink communications, are a same transmission mode, wherein the first sidelink communication is associated with a first HARQ feedback of the plurality of HARQ feedback, and wherein the second sidelink communication is associated with a second HARQ feedback of the plurality of HARQ feedback; and wherein identifying the HARQ feedback associated with the one or more sidelink communications comprises:

determining, based at least in part on determining that the transmission mode associated with the first sidelink communication and the transmission mode associated with the second sidelink communication are the same transmission mode, whether a distance between the UE and a first other UE of the one or more other UEs is shorter relative to a distance between the UE and a second other UE of the one or more other UEs; and identifying the first HARQ feedback or the second HARQ feedback based at least in part on determining whether the distance between the UE and the first other UE is shorter relative to the distance between the UE and the second other UE.

21. The method of claim 20, wherein determining whether the distance between the UE and the first other UE is shorter relative to the distance between the UE and the second other UE comprises:

determining that the distance between the UE and the first other UE is shorter relative to the distance between the UE and the second other UE; and wherein identifying the first HARQ feedback or the second HARQ feedback comprises:

identifying the first HARQ feedback based at least in part on determining that the distance between the UE and the first other UE is shorter relative to the distance between the UE and the second other UE.

22. The method of claim 20, wherein determining whether the distance between the UE and the first other UE is shorter relative to the distance between the UE and the second other UE comprises:

determining that the distance between the UE and the first other UE is not shorter relative to the distance between the UE and the second other UE; and wherein identifying the first HARQ feedback or the second HARQ feedback comprises:

identifying the second HARQ feedback based at least in part on determining that the distance between the UE and the first other UE is not shorter relative to the distance between the UE and the second other UE.

23. The method of claim 1, wherein the one or more parameters comprise:

a transmission mode associated with the plurality of sidelink communications, and one or more measurements associated with one or more other UEs;

wherein a transmission mode, associated with a first sidelink communication of the plurality of sidelink communications, and a transmission mode, associated with a second sidelink communication of the plurality of sidelink communications, are a same transmission mode, wherein the first sidelink communication is associated with a first HARQ feedback of the plurality of HARQ feedback, and wherein the second sidelink communication is associated with a second HARQ feedback of the plurality of HARQ feedback; and wherein identifying the HARQ feedback associated with the one or more sidelink communications comprises:

determining, based at least in part on determining that the transmission mode associated with the first sidelink communication and the transmission mode associated with the second sidelink communication are the same transmission mode, whether a signal strength measurement associated with a first other UE of the one or more other UEs is greater relative to a signal strength measurement associated with a second other UE of the one or more other UEs; and identifying the first HARQ feedback or the second HARQ feedback based at least in part on determining whether the signal strength measurement associated with the first other UE is greater relative to the signal strength measurement associated with the second other UE.

24. The method of claim 23, wherein determining whether the signal strength measurement associated with the first other UE is greater relative to the signal strength measurement associated with the second other UE comprises:

determining that the signal strength measurement associated with the first other UE is greater relative to the signal strength measurement associated with the second other UE; and wherein identifying the first HARQ feedback or the second HARQ feedback comprises:

identifying the first HARQ feedback based at least in part on determining that the signal strength measurement associated with the first other UE is greater relative to the signal strength measurement associated with the second other UE.

25. A user equipment (UE) for wireless communication, comprising:

a memory; and one or more processors, operatively coupled to the memory, configured to:
- determine a plurality of hybrid automatic repeat request (HARQ) feedback for a plurality of sidelink communications;
- identify, for at least a subset of HARQ feedback from the plurality of HARQ feedback and based at least in part on one or more parameters, HARQ feedback associated with one or more sidelink communications, of the plurality of sidelink communications, until the at least the subset of HARQ feedback fills a number of HARQ feedback that the UE is capable of transmitting in a HARQ feedback occasion, wherein the number of HARQ feedback is more than one HARQ feedback; and
- transmit, on a sidelink, the at least the subset of HARQ feedback in the HARQ feedback occasion.

26. The UE of claim 25, wherein the one or more parameters include a priority associated with the plurality of sidelink communications.

27. The UE of claim 25, wherein a respective priority, associated with each of the plurality of sidelink communications, is indicated in a respective sidelink control information (SCI) associated with each of the plurality of sidelink communications.

28. The UE of claim 25, wherein the one or more processors, when identifying for the at least the subset of HARQ feedback, are configured to:
- identify, for the at least the subset of HARQ feedback, HARQ feedback associated with a first sidelink communication, of the one or more sidelink communications, having a highest priority; and
- identify, for the at least the subset of HARQ feedback, HARQ feedback associated with one or more second sidelink communications, of the one or more sidelink communications, in an order of decreasing priority until the at least the subset of HARQ feedback fills the number of HARQ feedback that the UE is capable of transmitting in the HARQ feedback occasion.

29. A non-transitory computer-readable medium storing one or more instructions for wireless communication, the one or more instructions comprising:
one or more instructions that, when executed by one or more processors of a user equipment (UE), cause the one or more processors to:
- determine a plurality of hybrid automatic repeat request (HARQ) feedback for a plurality of sidelink communications;
- identify, for at least a subset of HARQ feedback from the plurality of HARQ feedback and based at least in part on one or more parameters, HARQ feedback associated with one or more sidelink communications, of the plurality of sidelink communications, until the at least the subset of HARQ feedback fills a number of HARQ feedback that the UE is capable of transmitting in a HARQ feedback occasion, wherein the number of HARQ feedback is more than one HARQ feedback; and
- transmit, on a sidelink, the at least the subset of HARQ feedback in the HARQ feedback occasion.

30. The non-transitory computer-readable medium of claim 29, wherein the one or more parameters include a priority associated with the plurality of sidelink communications.

31. An apparatus for wireless communication, comprising:
- means for determining a plurality of hybrid automatic repeat request (HARQ) feedback for a plurality of sidelink communications;
- means for identifying, for at least a subset of HARQ feedback from the plurality of HARQ feedback and based at least in part on one or more parameters, HARQ feedback associated with one or more sidelink communications, of the plurality of sidelink communications, until the at least the subset of HARQ feedback fills a number of HARQ feedback that the apparatus is capable of transmitting in a HARQ feedback occasion, wherein the number of HARQ feedback is more than one HARQ feedback; and
- means for transmitting, on a sidelink, the at least the subset of HARQ feedback in the HARQ feedback occasion.

32. The apparatus of claim 31, wherein the one or more parameters include a priority associated with the plurality of sidelink communications.

* * * * *